(12) United States Patent
Coglon et al.

(10) Patent No.: US 10,251,115 B2
(45) Date of Patent: Apr. 2, 2019

(54) SYSTEM AND METHOD FOR INTELLIGENT ASSISTANT SERVICE

(71) Applicant: Verizon Patent and Licensing Inc., Arlington, VA (US)

(72) Inventors: Jason A. Coglon, Morristown, NJ (US); Christian Guirnalda, New Brunswick, NJ (US); Andrew Wahlon Lam, River Edge, NJ (US); Juan Manuel Noceda, Stoneham, MA (US); Matthew S. Ross, New York, NY (US); Ohad Zeira, Morristown, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/698,595

(22) Filed: Sep. 7, 2017

(65) Prior Publication Data

US 2019/0075506 A1    Mar. 7, 2019

(51) Int. Cl.
*H04W 40/00*    (2009.01)
*H04W 40/02*    (2009.01)
*H04W 76/10*    (2018.01)

(52) U.S. Cl.
CPC .......... *H04W 40/02* (2013.01); *H04W 76/10* (2018.02)

(58) Field of Classification Search
CPC .......... H04W 4/16; H04W 4/12; H04W 4/06; H04W 4/02; H04W 92/02; H04W 76/02; H04W 8/26; H04W 8/18; H04W 88/06; H04W 88/02

USPC .......... 455/445, 412.1, 412.2, 415, 416, 417
See application file for complete search history.

(56) References Cited

U.S. PATENT DOCUMENTS

| | | | | |
|---|---|---|---|---|
| 7,653,191 | B1* | 1/2010 | Glasser | H04M 3/42229 379/201.1 |
| 8,837,704 | B2* | 9/2014 | Ramanathan | H04L 65/1006 379/201.01 |
| 9,736,308 | B1* | 8/2017 | Wu | H04M 3/5233 |
| 2005/0070282 | A1* | 3/2005 | Hinz | H04W 4/16 455/435.1 |
| 2005/0195802 | A1* | 9/2005 | Klein | H04L 12/6418 370/352 |
| 2006/0072726 | A1* | 4/2006 | Klein | H04M 3/42153 379/201.01 |
| 2007/0047522 | A1* | 3/2007 | Jefferson | H04L 29/06027 370/352 |

(Continued)

*Primary Examiner* — Temica M Beamer

(57) ABSTRACT

Artificial intelligence-based, intelligent agent (IA) services may include an IA server assisting users of a wireless network in various communication scenarios (e.g., calls, texts, chats, etc.). A user may specify rules for managing communications directed to a User Equipment (UE) of the user. Examples of such rules may include intercepting an incoming call to the user, managing the call based on whether the user is available, determining a reason for an incoming call and notifying the user about the reason, inviting the user to join the call, adding other users to the call, recording portions of the call, providing requested information, taking notes, scheduling meetings, and providing other assistant-type services, etc. The IA services may also include monitoring, interpreting, and responding to information that is sent to, or by, the user, during a communication, in addition to implementing Machine Learning procedures for self-improvement.

20 Claims, 16 Drawing Sheets

(56) References Cited

U.S. PATENT DOCUMENTS

2010/0310062 A1\* 12/2010 Srinivasan ........ H04M 3/42102
379/211.02
2011/0044442 A1\* 2/2011 Abramson .............. G06F 9/543
379/142.01
2013/0094637 A1\* 4/2013 Shaw ................ H04M 3/42059
379/88.18

\* cited by examiner

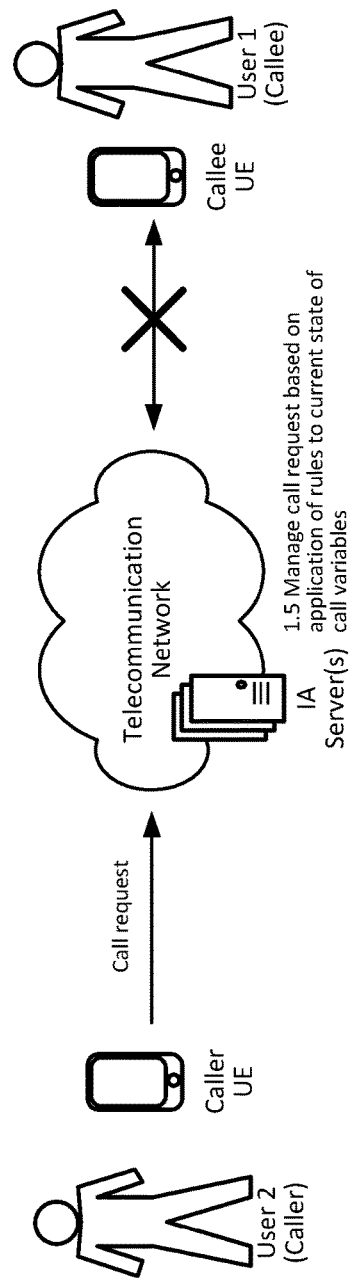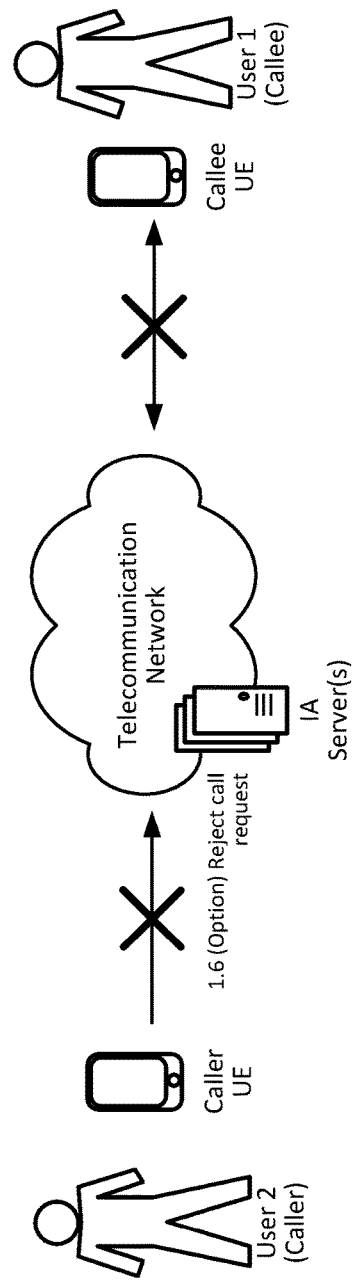

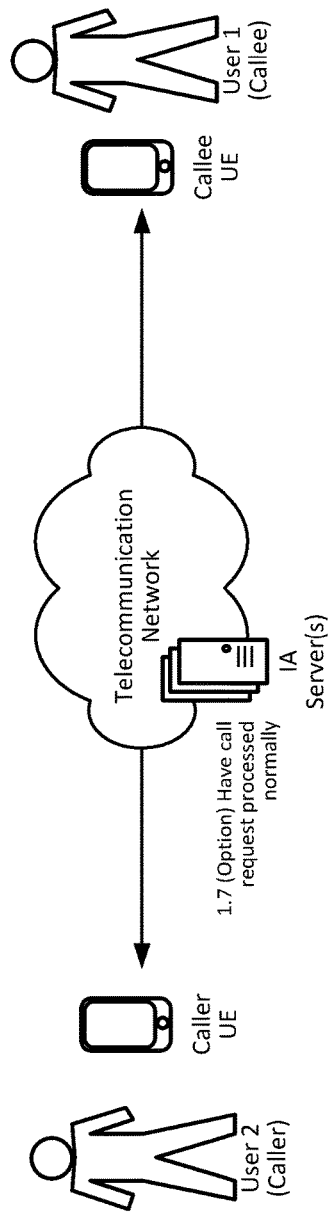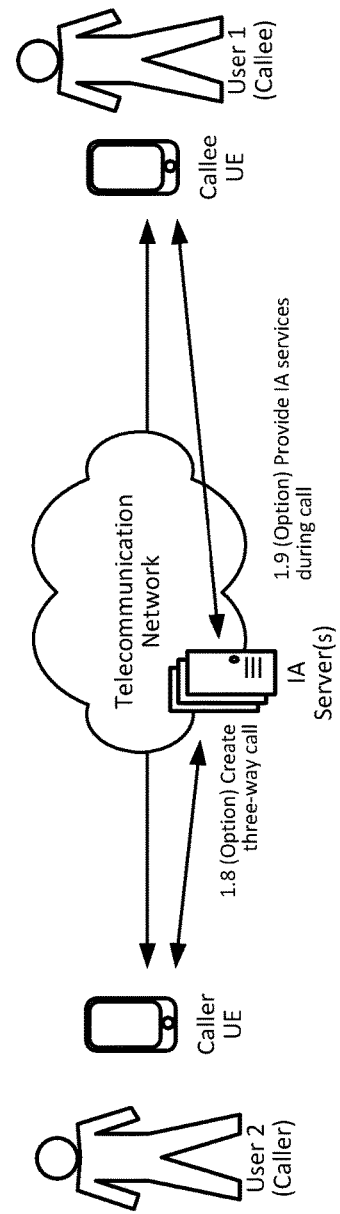

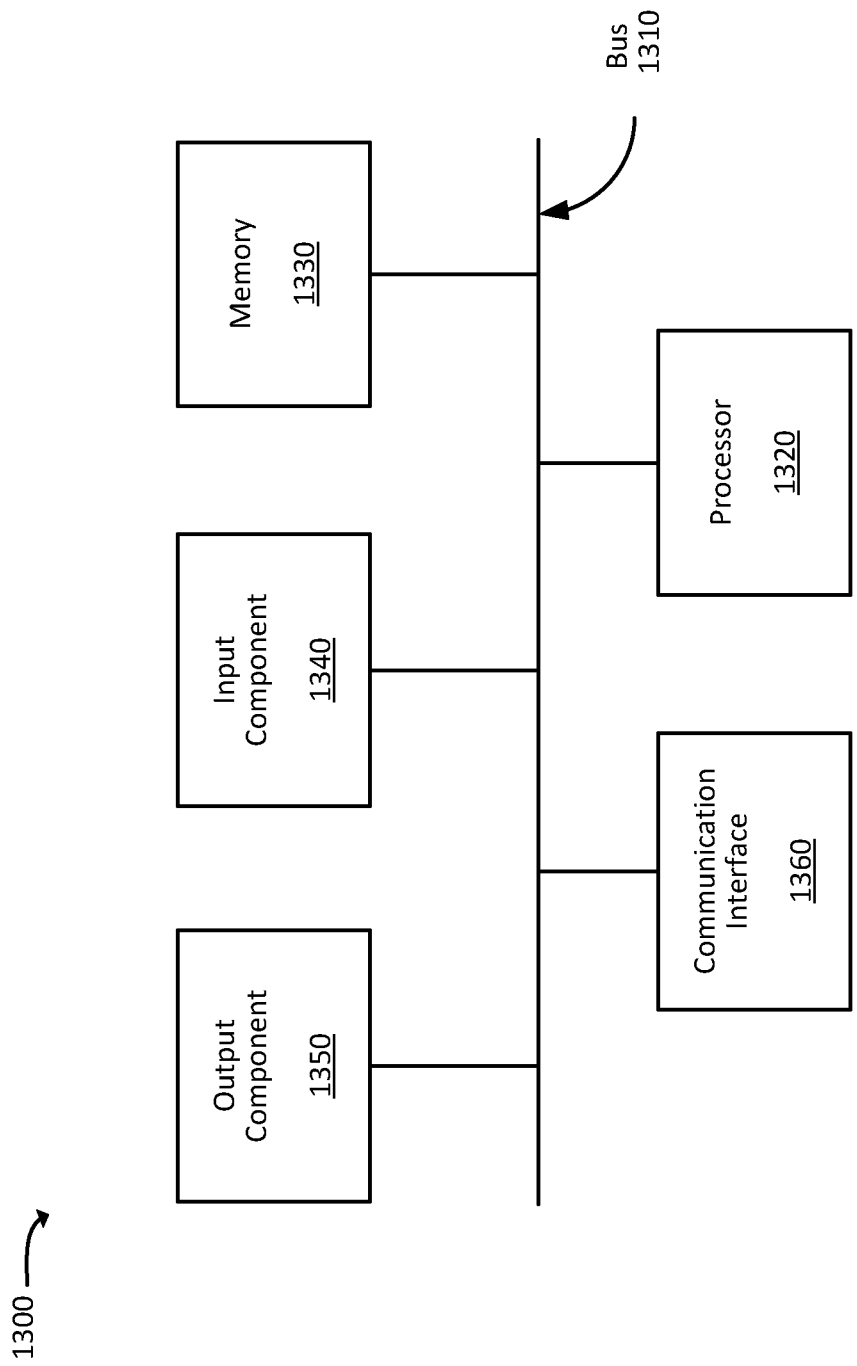

US 10,251,115 B2

SYSTEM AND METHOD FOR INTELLIGENT ASSISTANT SERVICE

BACKGROUND

Providing telecommunication services to users may include enabling User Equipment (UE) devices to call, text, and otherwise communicate with one another via a wireless telecommunication network. In some instances, the wireless telecommunication network may provide UEs with network-based services, such as text message services, voicemail services, and voice command services. Machine learning and artificial intelligence services may sometimes be provided in combination with such services.

BRIEF DESCRIPTION OF THE DRAWINGS

Embodiments of the present disclosure will be readily understood by the following detailed description in conjunction with the accompanying drawings. To facilitate this description, like reference numerals may designate like structural elements. Embodiments of the disclosure are illustrated by way of example and not by way of limitation in the figures of the accompanying drawings.

FIGS. 1A-1G illustrate an example overview of an embodiment described herein;

FIG. 13 is a block diagram of example components of a device.

DETAILED DESCRIPTION OF PREFERRED EMBODIMENTS

Figure 1A:
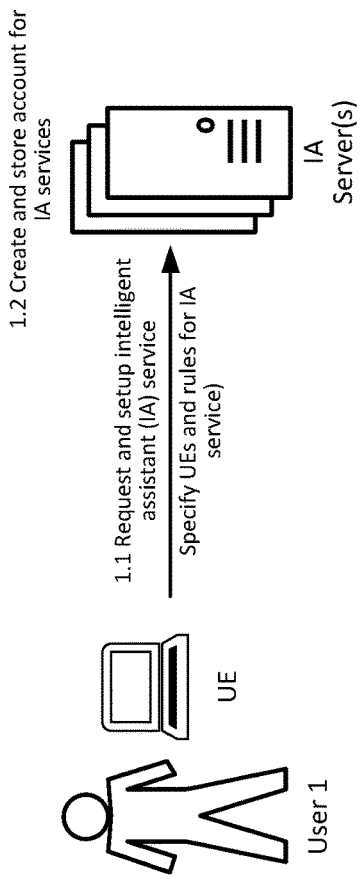

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the appended claims and their equivalents.

The systems and methods described herein may be used to provide users with intelligent assistant (IA) services via a fully functional, artificially intelligent wireless network. IA services may include a variety of dynamic and customizable network functions for receiving, managing, and providing support for communications (e.g., calls, Simple Messaging Service (SMS) messages, etc.) between User Equipment (UE) devices (e.g., smartphones, laptop computers, desktop computers, etc.).

A UE may communicate with an IA server to register for IA services, which may include selecting one or more rules that determine how the IA server may handle incoming calls to the UE. For example, when another UE attempts to call (also referred to herein as the "caller UE") the UE registered for IA services (also referred to herein as the "callee UE"), the IA server may intercept the incoming call and manage the call based on the rules associated with the callee UE. The IA server may allow the incoming call to reach the callee UE when the callee UE is available but, when the callee UE is unavailable, the IA server may reroute the call so that the call is established between the caller UE and the IA server.

The IA server may include, or have access to, an Interactive Voice Response (IVR) server that enables the IA server to communicate audibly with a user of the caller UE (also referred to herein as the "caller"). Additionally, the IA server may include, or have access to, a text-to-speech server and/or an Artificial Intelligence (AI) server that enable the IA server to interpret audible statements of the caller by recording the statements, transcribing the statements to text via the text-to-speech server, and determine the meaning of the statements via the AI server. The IA server may apply the meaning of the statements to the rules specified by the callee, and determine how to further handle the call on behalf of the callee.

For example, the IA server may converse with or query the caller to determine the reason for the call and estimate a level of importance or priority of the call. If the incoming call is of little importance (e.g., a telemarketing call), the IA server may terminate the call without notifying the callee; if the incoming call is of moderate importance (e.g., relates to a business or professional matter), the IA server may offer to record a message from the caller and relay the message to the callee via text message; if the incoming call is of great importance (e.g., a family emergency), the IA server may attempt to add the callee to the call. Examples of rules may also, or alternatively, include instructions for relaying text messages between the caller and the callee, asking the caller follow-up questions when a previous response from the caller was vague or indefinite, offering dictation services for sending a message to the callee, scheduling a subsequent date and/or time for the caller to call back, monitoring and responding to text messages sent to and/or from the callee, creating group calls in response to an audible command or text message from the callee, etc.

Additionally, or alternatively, other examples of rules may include instructions for receiving a command to schedule a meeting between the callee, the caller, and/or one or more other individuals, checking a schedule of the callee to determine potential meeting dates/times, communicating with meeting invitees (e.g., caller and one or more others) regarding their availability for a meeting the callee, and/or sending an invitation to those invited to the meeting. Additionally, or alternatively, the rules may include instructions for arranging services (e.g., a bridge service) for the meeting, calling those invited to the meeting, and providing assistant services (e.g., taking notes about the meeting, recording portions of the meeting, calling others to join the meeting, etc.). These and other capabilities of the IA server are described in additional detail below.

FIGS. 1A-1G illustrate an example overview of an embodiment described herein. As shown in FIG. 1A, a user (User 1) may operate a UE (e.g., smartphone, laptop computer, etc.) to request and setup IA services, provided by one or more IA server devices, for handling calls on behalf of the user (at 1.1). To setup the IA services, the user may create an account and specify a UE (e.g., a smartphone, tablet computer, etc.) for which the IA services are to apply, in addition to one or more rules for managing calls directed to the specified UE. The rules may include instructions for handling calls based on an availability of the user, the purpose or subject of the call, inquiries to be made to the caller, terminating the call, how the IA servers may communicate with the user (User 1) without adding the user to the call, the conditions under which the user may be added to a call, etc.

Figure 1B:
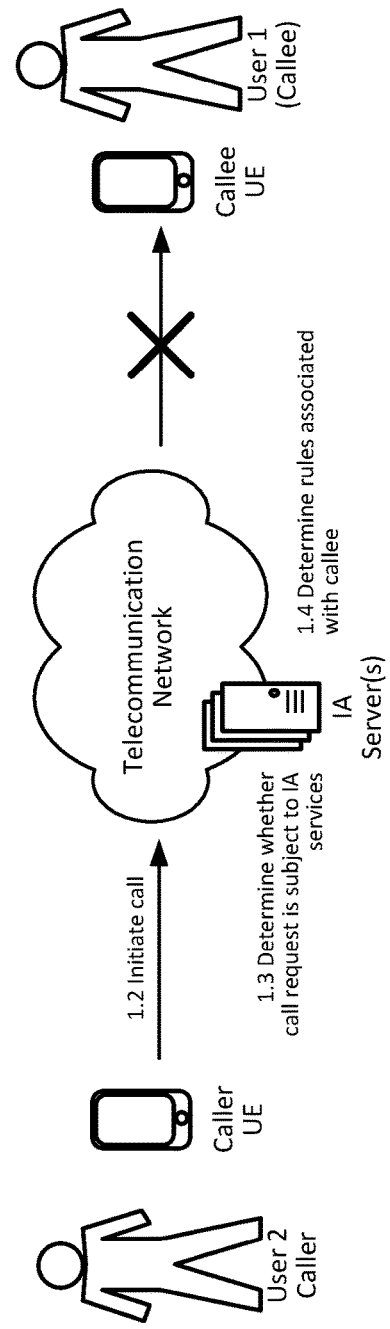

Referring to FIG. 1B, another user (User 2) may initiate a call directed to the UE (Callee UE) of User 1 (at 1.2). This may include a call request sent to an IP Multimedia Subsystem (IMS) core of the network. A Telephony Application Server (TAS) of the IMS core may receive the call request and, in response, send a request to the IA server to determine whether the call request is directed to a user (e.g., User 1) that is registered for IA services. In some embodiments, the request from the TAS may include a Mobile Device Number (MDN) of the UE to which the call request is directed (e.g., the callee UE). The IA server may use the MDN to query a database of user accounts that are subscribed to IA services (at 1.3).

When the MDN fails to match the MDN to any user accounts, the IA server may notify the TAS that the call is not subject to IA services, and the TAS may proceed to setup the call as a standard communication session. When the MDN matches a user account, the IA server may identify one or more rules associated with the user account (e.g., rules previously specified by User 1 for providing IA services) (at 1.4).

Referring to FIG. 1C, the IA server may determine how to handle (e.g., respond to) the call request by applying the rules, associated with the user account, to current call state variables (at 1.5). Current call state variables may include information that is relevant to a pending request to initiate a communication session (e.g., a call request), an ongoing communication session (e.g., an ongoing call), user information, etc. Examples of (e.g., a current time of day, whether the caller UE is known or unknown, whether User 1 is available, whether User 1 has temporarily disabled IA services, information included in the call request (e.g., an MDN of caller UE), etc.). As call state variables may include any type of information pertaining to a particular call request, ongoing call, etc., current call state variables may change throughout the duration of a communication session. For example, information (e.g., questions, requests, commands, etc.) exchanged between the IA server, the caller UE, and/or the callee UE may be examples of changes in the current call state variables of a call. Additionally, IA services, as described herein, may be provided based on applying rules to current call state variables of a communication session, the rules that may apply and/or the manner in which rules may apply may vary as the current call state variables change.

In the example of FIG. 1D, by applying the rules to the current call state of variables, the IA server may determine that the IA server is to refuse the call request. For example, the IA server may determine that an MDN of the caller UE is part of a list of MDNs that User 1 would like to block. As such, the IA server may send a request to the TAS to terminate the call, and the TAS may respond accordingly (at 1.6). In the example of FIG. 1E, by applying the rules to the current call state of variables, the IA server may determine that even though User 1 is registered for IA services, the call request should be processed as a standard call request (e.g., without any interference or participation from the IA server). For instance, the IA server may determine that User 1 has temporarily disabled IA services for incoming calls. In such a scenario, the IA server may notify the TAS that the call request is to be processed as a normal call (even though the call request is directed to user registered for IA services) (at 1.7).

In the example of FIG. 1F, by applying the rules to the current state of call variables, IA server may determine that the IA server is not to interact with (e.g., speak to) User 2 before User 2 is permitted to speak with User 1; however, the IA server is also to be on the call between User 2 and User 1. For example, an MDN of the callee UE may be on a list of MDNs that are of particular importance to User 1, such that User 2 should be connected to User 1 as soon as possible. As such, the IA server may cause a three-way call to be established between the caller UE, the IA server, and the callee UE (at 1.8). To do so, the IA server may notify the TAS that the call is subject to IA services, and in response, the TAS may reroute the call request to the IA server, such that a two-way call is established, between the IA server and the caller UE, when the IA server respond to the rerouted call request. The IA server may then notify the TAS that the callee UE is to be added to the call, and the TAS may respond by communicating a suitable call request to the callee UE. When the callee UE receives and accepts the call request, the two-way call between the caller UE and the IA server may become a three-way conference call between the caller UE, the IA server, and the callee UE. The functionality of converting the two-way call to the three-way call may be provided by the TAS. As such, the IA server may be a party a call between Caller 1 and Caller 2, with the IA server having interacted with User 2. Additionally, the IA server may provide IA service, such as recording portions of the call, scheduling follow-up meetings or related activities, inviting other users to join the conference call, etc. (at 1.9).

Figure 1G:
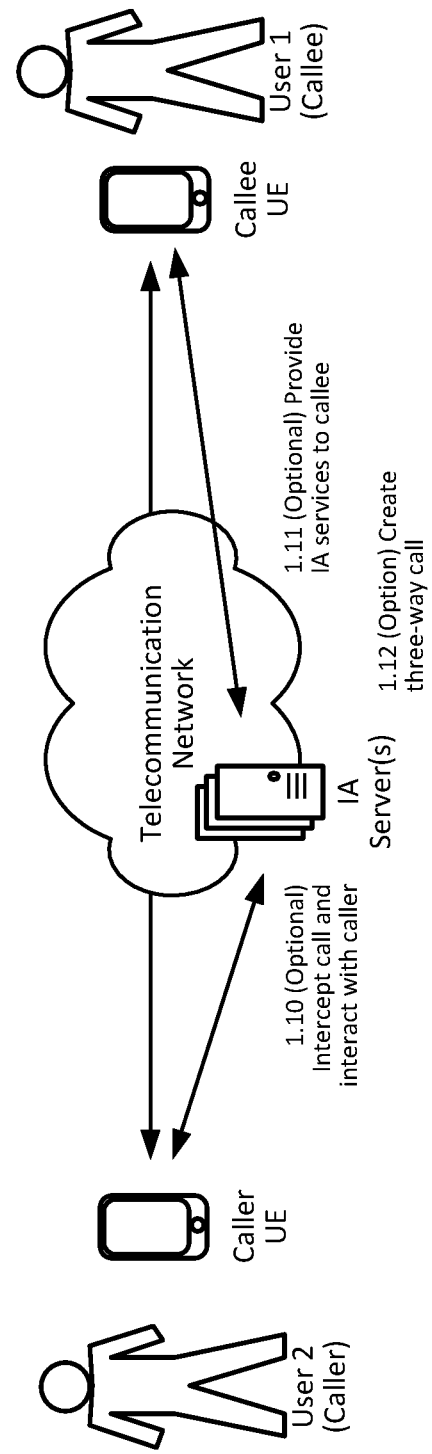

In the example of FIG. 1G, by applying the rules to the current state of call variables, IA server may determine that the IA server is to interact with User 2 before User 2 is permitted to interact with User 1. For example, User 1 may have specified a rule such that the IA server is to intercept incoming calls to determine the purpose of the calls (at 1.10). The IA server may intercept the incoming call by notify the TAS that the call is subject to IA services. In response, the TAS may reroute the call request to the IA server, and the IA server may establish a call between the caller UE and the IA server by responding to the rerouted call request. As such, before the network notifies User 1 about an incoming call, the IA server may intercept the incoming call and establish a call between the caller UE and the IA server (instead of callee UE).

Once a call exists between the caller UE and the IA server, IA server may continue to apply rules to the current call state, which may cause the IA server to interact with User 2 based on one or more programmed features, such as requesting that User 2 provide a reason for calling, asking User 2 to dictate a note for User 1, routing the call to another phone number, etc. (at 1.10). As the IA server continues to apply rules to the current call state (which may include decisions and inputs from User 2, responses to questions and requests from the IA server to User 2, etc.), the call between the IA server and caller UE may have various outcomes. For example, the IA server may determine that the call has been resolved or is no longer worth perusing, and IA server end the call by terminating the communication session with the caller UE. As another example, the IA server may provide callee UE with a message or recording from caller UE. In yet another example, the IA server may determine that User 1 should be conferenced into the call, and the IA server may cause the callee UE to be added to the call in a manner similar to that described above with reference to FIG. 1F.

After the callee UE is added to the call, the IA server may continue providing IA services, such as monitoring audible communications to and from the callee UE, communicating with a text-to-speech server to have the audible communications transcribed to text, communicating with an AI server to determine the meaning of the communications, and responding to the communications in accordance with one or more rules. For example, in response to a command by the callee or autonomously (e.g., by a default setting or a rule previously specified by the callee), the IA server may record the call, provide certain types of information (e.g., user information provided to the IA server during the registration process), invite other users to the call, provide reminders to users about upcoming meetings and events, identify schedule openings for one or more users and schedule meetings or other appoints.

Furthermore, while some examples and embodiments, described herein, may be presented within (or otherwise involve) a context of an incoming call to a user that is registered for IA services (e.g., a callee), any of the operations, processes, features, and/or services, described herein, may be readily applied (in any order and combination) to other scenarios, including scenarios in which the user proactively contacts IA server 265 without calling another user, the user initiating a call with another user and then later requesting that IA server 265 join the call, scenarios involving groups of users (e.g., three or more users), and/or one or more other types of scenarios.

Figure 2:
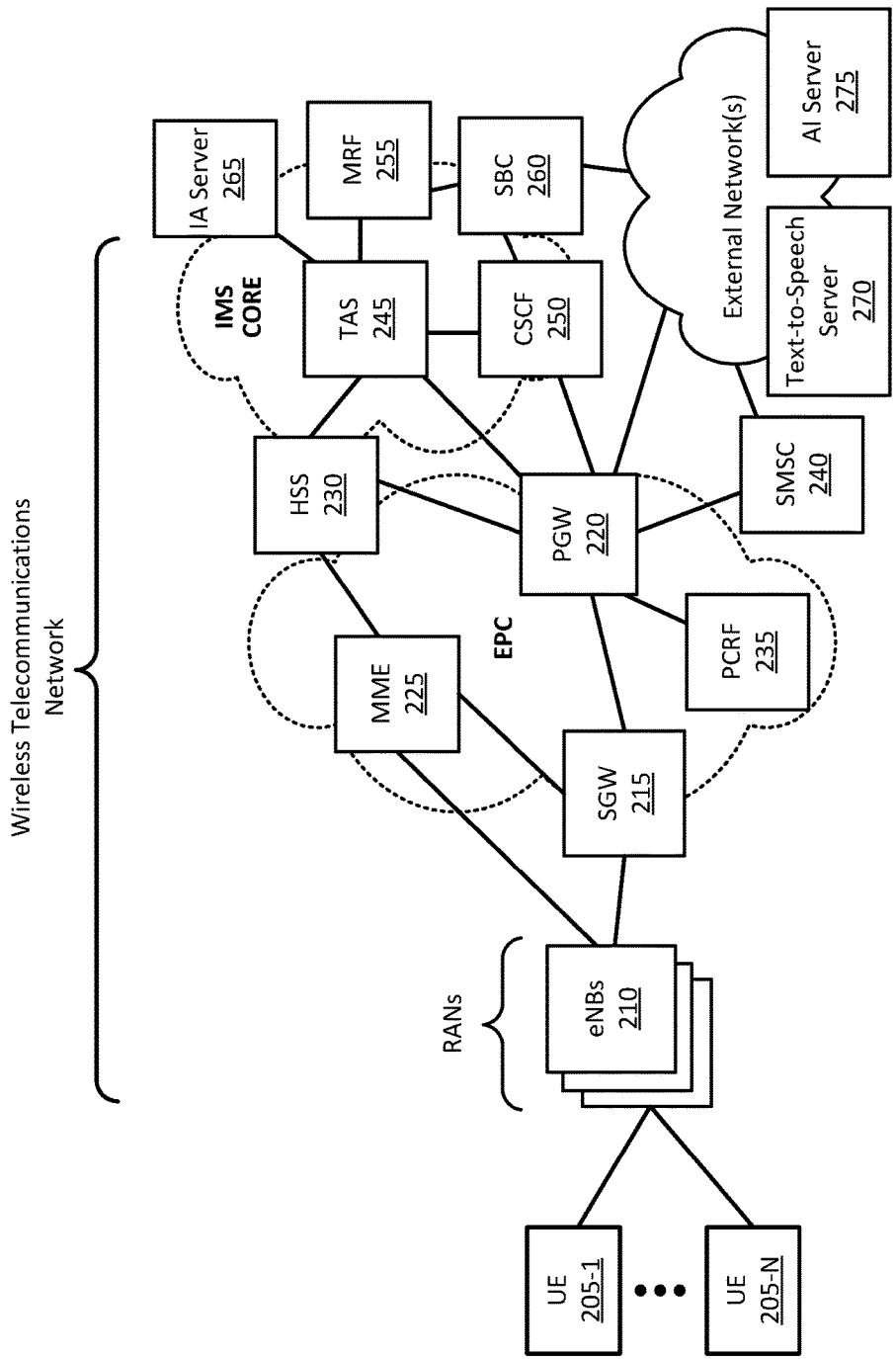
FIG. 2 illustrates an example environment in which systems and/or methods described herein may be implemented.

FIG. 2 is a diagram of an example environment 200 in which systems and/or methods described herein may be implemented. Environment 200 may include UEs 205 (referred to individually as "UE 205" and collectively as "UEs 205"), one or more radio access networks (RANs), a wireless telecommunication network, and one or more external networks. The wireless telecommunication network may include an Evolved Packet System (EPS) that includes a Longer-Term Evolution (LTE) network and/or an evolved packet core (EPC) network that operates based on a 3rd Generation Partnership Project (3GPP) wireless communication standard. The LTE network may be, or may include, RANs that include one or more base stations, some or all of which may take the form of enhanced Node Bs (eNBs) 210, via which UEs 205 may communicate with the EPC network.

The EPC network may include Serving Gateway (SGW) 215, Packet Data Network (PDN) Gateway (PGW) 220, Mobility Management Entity (MME) 225, Home Subscriber Server (HSS) 230, Policy and Charging Rules Function (PCRF) 235, and/or SMS Center (SMSC) 240. As shown, the EPC network may enable UEs 205 to communicate with an external network, such as a Public Land Mobile Networks (PLMN), a Public Switched Telephone Network (PSTN), and/or an IP network (e.g., the Internet).

The wireless telecommunications network may also include an IMS core, which may include Telephony Application Server (TAS) 245 and Call Session Control Function (CSCF) 250. In some embodiments, the IMS core may include additional devices, such as a Media Resource Function (MRF) server 255, Session Boarder Control (SBC) server 260, IA server 265, etc. The IMS core may help deliver IP multimedia services, such as Voice over IP (VoIP) services, video calling services, etc., to UEs 205. The IMS core may operate based on the 3GPP wireless communication standard.

UE 205 may include a portable computing and communication devices, such as a personal digital assistant (PDA), smart phone, cellular phone, laptop computer with connectivity to the wireless telecommunications network, a tablet computer, etc. UE 205 may also include a non-portable computing device, such as a desktop computer, consumer or business appliance, smart television, or another device that has the ability to connect to the wireless telecommunications network. UE 205 may also include a computing and communication device that may be worn by a user (also referred to as wearable devices) such as a watch, a fitness band, a necklace, glasses, an eyeglass, a ring, a belt, a headset, or another type of wearable device.

eNB 210 may include one or more network devices that receive, process, and/or transmit traffic, such as voice calls and data, destined for and/or received from UE 205. eNB 210 may receive traffic from and/or send traffic to external networks or other devices via SGW 215 and PGW 220. eNB 210 may send traffic to and/or receive traffic from UEs 205 via an air interface.

SGW 215 may aggregate traffic received from one or more eNBs 210 and may send the aggregated traffic to another network or device via PGW 220. Additionally, SGW 215 may aggregate traffic received from one or more PGWs 220 and may send the aggregated traffic to one or more eNBs 210. SGW 215 may operate as an anchor for the user plane during inter-eNB handovers and as an anchor for mobility between different telecommunication networks. PGW 220 may include one or more network devices that may aggregate traffic received from one or more SGWs 220, and may send the aggregated traffic to an external network or another device. PGW 220 may also, or alternatively, receive traffic from an external network and may send the traffic toward UE 205 (via SGW 215 and/or eNB 210).

MME 225 may include one or more computation and communication devices that act as a control node for eNB 210 and/or other devices that provide the air interface for the wireless telecommunications network. For example, MME 225 may perform operations to register UE 205 with the wireless telecommunications network, to establish bearer channels (e.g., traffic flows) associated with a session with UE 205, to hand off UE 205 to a different eNB, MME, or another network, and/or to perform other operations. MME 220 may perform policing operations on traffic destined for and/or received from UE 205.

HSS 230 may include one or more devices that may manage, update, and/or store, in a memory associated with HSS 230, profile information associated with a user or subscriber (e.g., a subscriber associated with UE 205). The profile information may identify applications and/or services that are permitted for and/or accessible by the subscriber; a Mobile Directory Number (MDN) associated with the subscriber; bandwidth or data rate thresholds associated with the applications and/or services; and/or other information. The subscriber may be associated with UE 205. Additionally, or alternatively, HSS 230 may perform authentication, authorization, and/or accounting operations associated with the subscriber and/or a communication session with UE 205.

PCRF 235 may include one or more devices that may receive information regarding policies and/or subscriptions from one or more sources, such as subscriber databases and/or from one or more users. PCRF 235 may provide these policies to PGW 220 or another device so that the policies can be enforced. As depicted, in some embodiments, PCRF 235 may communicate with PGW 220 to ensure that charging policies are properly applied to locally routed sessions within the telecommunications network. For instance, after a locally routed session is terminated, PGW 220 may collect charging information regarding the session and provide the charging information to PCRF 235 for enforcement.

SMSC 240 may include one or more devices that may store, forward, convert, and deliver SMS messages. In some implementation, SMSC 240 may receive and respond to instructions from UE 205, TAS 245, IA Server 265, etc., to send a SMS message to another UE 205 regarding an ongoing call. SMSC 240 may include, and/or communicate with, a messaging gateway (which may include a SMPP function) for communicating with one or more other messaging gateways (e.g., a messaging gateway of another network).

TAS 245 may include one or more computation and communication devices that may provide IP call (e.g., VoIP) services by managing calls between UEs 205, between IA server 265 and UE 205, between IA server 265 and multiple UEs 205, etc. TAS 245 may translate a telephone number into an IP address and/or an IP address into a telephone number in order to establish a call. TAS 245 may also provide call routing and/or call bridge services and/or operate based on a particular communication protocol, such as SIP.

CSCF 250 may include one or more computation and communication devices that may gather, process, search, store, and/or provide information in a manner described herein. CSCF 250 may process and/or route calls to and from UE 205 via the EPC. For example, CSCF 250 may process calls, received from an external network, that are destined for UE 205. In another example, CSCF 250 may process calls, received from UE 205, that are destined for the external network.

SBC 260 may include one or more computation and communication devices that may gather, process, search, store, and/or provide functions and information in a manner described herein. SBC 260 may function as an interface between UEs 205 of the wireless telecommunication network and/or UEs of another network. For example, SBC 260 may receive incoming calls directed to UEs 205 of the wireless telecommunication network, and communicate with HSS 230 and TAS 245 to setup the call between IA server 265 and the caller UE 205. SBC 260 may also participate in the remainder of the call as a support device involving communications between the IMS core and caller UE 205.

MRF server 255 may include one or more computation and communication that may gather, process, search, store, and/or provide functions and information in a manner described herein. MRF server 255 may include an IVR server capable of communicating with UEs 205 involved in a call. For example, MRF server 255 may play audio files to UEs 205 involved in a call, detect audible responses from users of the UEs 205, record the audible response, provide the audible responses to IA server 265, text-to-speech server 270, or another device, etc.

Text-to-speech server 270 may include one or more computation and communication devices that may convert audible information (e.g., an audio recording) to text. In some embodiments, text-to-speech server 270 may receive an audio recording from another device (e.g., IA serer 265, MRF server 255, etc.), transcribe the content of the audio recording to text, and provide the transcribed text to IA server 265. In some embodiments, text-to-speech server 270 may also, or alternatively, covert information from text to audio and provide the converted information to another device (e.g., IA serer 265, MRF server 255, etc.).

AI server 275 may include one or more computation and communication devices that may include one or more AI functions for analyzing and interpreting information. In some embodiments, AI server 275 may include a neural network function that may use interconnected groups of nodes (e.g., input nodes, hidden nodes, and output nodes) with weighted connections between the nodes. In some embodiments, AI server 275 may use neural network functions to evaluate statement originating from a user (e.g., the caller or the callee), interpreted the meaning of the statement, and provide the interpretation to IA server 265. The AI server 275 may include self-improving functions capable of identifying and correcting flaws regarding how effectively and/or accurately AI server 275 functions in its capacity as an AI device. The AI server 275 may include one or more machine-learning functions that may draw upon one or more learning tools, such as logical rules/commands, the analysis of examples (e.g., past performance or previously encountered and/or addressed issues), the creation of models to test and measure hypothetical conditions and solutions, data search, collection, and analysis tools, mathematical and statistical analysis tools, etc.

The quantity of devices and/or networks, illustrated in FIG. 2, is provided for explanatory purposes only. In practice, environment 200 may include additional devices and/or networks; fewer devices and/or networks; different devices and/or networks; or differently arranged devices and/or networks than illustrated in FIG. 2. For example, while not shown, environment 200 may include devices that facilitate or enable communication between various components shown in environment 200, such as routers, modems, gateways, switches, hubs, etc. Alternatively, or additionally, one or more of the devices of environment 200 may perform one or more functions described as being performed by another device of environment 200. Additionally, the devices of environment 200 may interconnect with each other, and/or other devices, via wired connections, wireless connections, or a combination of wired and wireless connections. In some embodiments, one or more devices of environment 200 may be physically integrated in, and/or may be physically attached to, one or more other devices of environment 200. Also, while "direct" connections are shown in FIG. 2 between certain devices, some devices may communicate with each other via one or more additional devices and/or networks.

Figure 3:
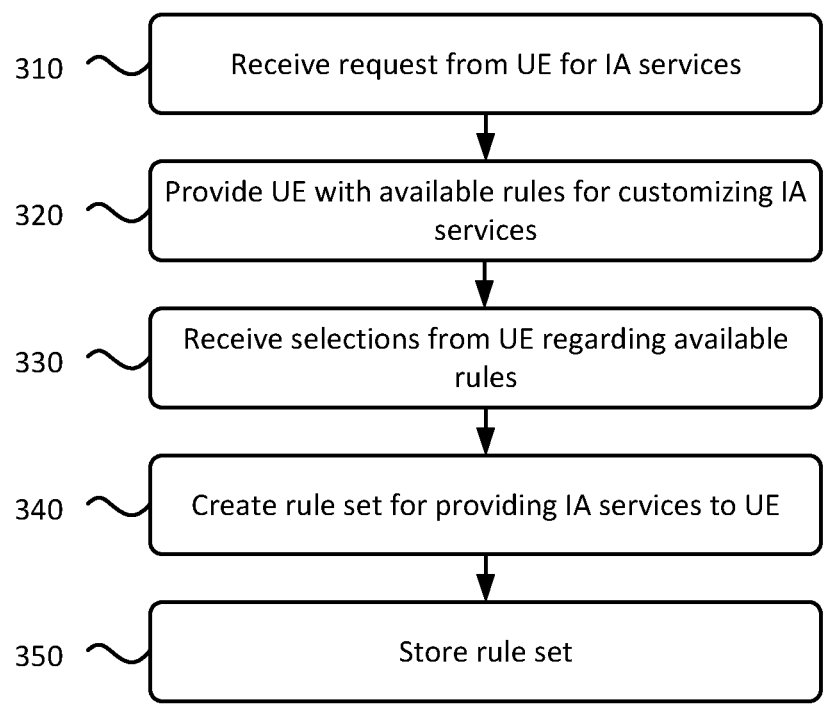
FIG. 3 is a diagram of an example process for registering a User Equipment (UE) device for intelligent assistant (IA) services.

FIG. 3 is a diagram of an example process for registering UE 205 for IA services. Process 300 may be performed by IA server 265. In some embodiments, some or all of process 300 may be performed by one or more other devices, including TAS 245, MRF 255, SBC 260, text-to-speech server 270, AI server 275, or an application server of the wireless telecommunication network or the external network. FIG. 3 is described below with reference to FIG. 4.

As shown, process 300 may include receiving a request from UE 205 for IA services (block 310). For example, IA server 265 may host a webpage or another type of network portal/interface that describes services offered by an operator of the network. In some embodiments, the network portal/interface may also, or alternatively, be provided by a third-party provider/server. The services may include the IA service as described herein. A user of UE 205 may access the webpage and input information and select one or more links (or another type of interface object) that enables the user to create a user account and sign up for the IA service.

Process 300 may include providing UE 205 with available rules for customizing the IA service (block 320). For instance, when a user registers for IA service, IA server 265 may provide UE 205 with one or more webpages (and/or other types of portals) for customizing the IA service. The webpages may include rules that the user may select to customizing how the IA service is to function for the registered user. In some embodiments, the user may type in commands, questions, statements, and/or specify types of information (e.g., information about the user) that may be used by AI server 265 to create and/or customize rules.

Figure 4:
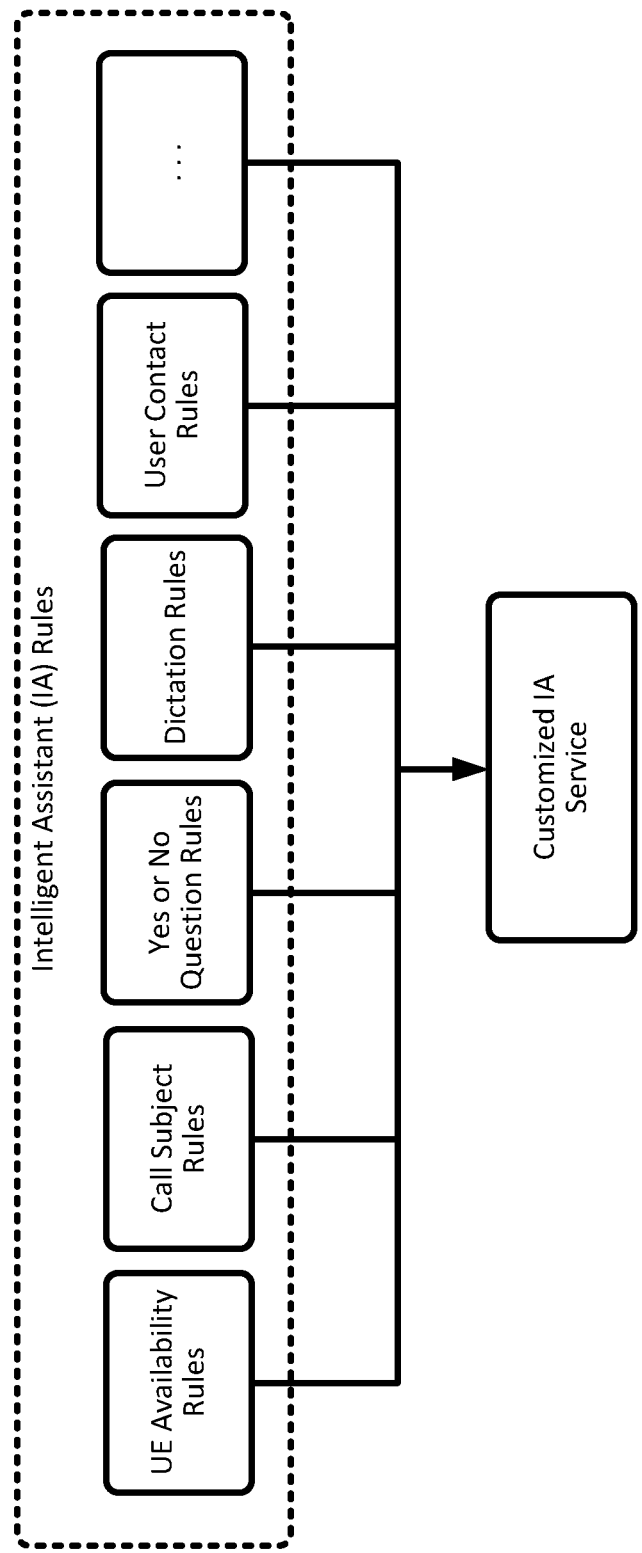
FIG. 4 is an example of rules for customizing an IA service for a user.

FIG. 4 is an example of rules for customizing an IA service for a user. As shown, the rules may include one or more UE availability rules, call subject rules, yes or no question rules, dictation rules, user contact rules, and more. In some embodiments, the rules for customizing IA services may include fewer rules, additional rules, and/or alternative rules than those shown in FIG. 4. For example, FIG. 6 (which is described further below) includes examples of group call rules and contact callee rule that are not explicitly depicted in FIG. 4.

UE availability rules may specify how IA server 265 may manage an incoming call based on the availability (or the unavailability) of a particular UE 205. For instance, when an incoming call is intercepted by IA server 265, IA server 265 may determine whether the callee UE 205 is available to receive the call. If the available, IA server 265 may process the incoming call request as a normal call (e.g., by forwarding the incoming call to the callee UE 205), send a text message to the callee UE 205 about the incoming call, etc. If the callee UE 205 is unavailable, IA server 265 may notify the caller that the callee is unavailable, offer to record a message, etc.

Call subject rules may include instructions for IA server 265 to determine the purpose for an incoming call and instructions for how to manage the call based on the purpose for the call. For example, after IA server 265 has intercepted an incoming call to a user registered for IA services, IA server 265 (in accordance with the call subject rules specified by the registered user) may ask the caller why he or she is calling the callee. IA server 265 may record the caller's answer, provide the recorded answer to speech-to-text server 270 for transcription, and send a text message with the transcription to the callee along with a prompt that enables the callee to take the call or refuse the call. In some embodiments, IA server 265 may also, or alternatively, call the callee and playback the message.

In some embodiments, before IA server 265 contacts the callee about the reason for the call, IA server 265 may determine whether the nature of the call (e.g., an emergency, a subject of interest that was previously specified as important or otherwise significant by the callee, etc.). In some embodiments, IA server 265 may determine the importance of a call by comparing an input from the caller to subjects that the callee has identified as important (e.g., while registering for, or subsequently managing, the IA service). In some embodiments, IA server 265 may determine the importance of a call by providing an input from the callee to AI server 275 for interpretation, receiving the interpretation from AI server 275, and determining the importance of the call based on the interpretation from AI server 275.

Yes or no question rules may include instructions for asking yes or no questions. In one example, yes or no question rules may enable a caller to ask the callee a yes or no question without having the callee added to the call. For instance, IA server 265 may intercept a call initiated by a caller and directed to a callee registered for IA services. IA server 265 may determine that the UE 205 of callee is attached to the network but that the callee is unavailable to take calls. In response, IA server 265 may inform the caller that the callee is currently unavailable to take the call, and ask whether the caller has a simple question (e.g., a question with a yes or no answer) for the callee. If so, the caller may state the question, and IA server 265 may record the question, have the audio recording converted into text, and have a text message sent to the callee with the question. The text message may also include other information, such as information identifying the name, number, location, etc., of the caller, an indication that IA server 265 is currently communicating with the caller, etc. The callee may respond to the question by sending a text message (with the callee's answer) to IA server 265. The IA server 265 may receive the callee's answer, convert the answer from text to audio, and read the answer back to the caller. In some scenarios, IA server 265 may provide a similar liaison type functions involving questions from the callee to the caller.

Other examples of yes or no question rules may include IA server 265 asking the caller whether he or she would like the IA server 265 to leave a message for the callee (e.g., because the callee is currently unavailable), and providing the options of an audio message, a text message, an email message, or another type of message. Another example of a yes or no rules may include asking whether the caller would be willing to call back at a later time and, if so, whether the caller would like to inform the callee about when the caller will likely call back. A yes or no question may include follow-up questions to clarify a previous input from the caller. For example, if IA server 265 is unable to determine whether the subject of the call is important (e.g., based on a call subject rule) IA server 265 may ask one or more additional questions (e.g., yes or no questions) to help determine the nature of the call.

Dictation rules may include instructions for how IA server 265 is to handle inputs from the caller. An example of a dictation rule may include whether IA server 265 may offer (to the caller) to record a message from the caller, have a transcript of the recording created, and how to communicate the transcript to the caller (e.g., text message, email, etc.). In some embodiments, dictation services may be dependent on one or more conditions, such as whether the subject of the call is determined to be important enough to provide dictation services. For instance, IA server 265 may determine the importance of a call based on call subject rules, and only provide dictation services if the call is deemed important enough. Dictation rules may also, or alternatively, include limitations regarding the size (e.g., length, duration, etc.) of a message from the caller.

User contact rules may include instructions about when and how IA server 265 may contact the callee. An example of user contact rules may include when IA server 265 may add the callee to the call intercepted by IA server 265 (e.g., upon determining that: 1) the callee is available to take the call; and 2) the call is an emergency or otherwise important). Another example of user contact rules may include whether to send a dictated message to the callee via text message, email, voicemail, etc., and/or whether to provide the callee with a convenient way be added to the call after receiving the message (e.g., a button in a text message, link in an email, particular response to a voicemail ("To join this call, press the number 1"), etc.).

As shown in FIG. 4, IA server 265 may combine the IA rules selected (or otherwise specified) by the user to create a customized IA service. This may include rule dependencies, such that the execution of one rule may depend on an outcome from applying another rule. For instance, as described above, whether and how IA server 265 contacts the callee (a user contact rule) may depend whether IA server 265 determines that the subject of the call is adequately important (a call subject rule). Some rule dependencies may be based on the user explicitly specifying a rule dependency, while other rule dependencies may be automatically added/created by IA server 265 based on the nature of the rules selected by the user.

Returning to FIG. 3, process 300 may include receiving rule selections from UE 205 regarding the available rules (block 330). For example, IA server 265 may receive inputs that describe how the user would like IA server 265 to operate (e.g., handle incoming calls). The inputs may include selections about which rules IA server 265 should implement and/or information about how the user would like those rules to be applied (e.g., conditions for applying one or more rules, dependencies between one or more rules, words and phrases IA server 265 should use when applying a rule, etc.).

Process 300 may also include creating a rule set for providing IA services to UE 205 (block 340). For example, IA server 265 may process and compile the inputs from the user (e.g., selected rules, conditions, dependencies, text inputs, etc.) and create a cohesive set of rules, which may amount to a logical process of functions, for handling and managing incoming calls. In some embodiments, IA server 265 may automatically (or by default) add one or more additional rules to the rule set. For example, IA server 265 may automatically include rules for receiving and executing (audio or text) commands from a registered user during a call. Examples of such commands may include the registered user telling IA serer 265 to start or stop recording a call or to invite other users to on ongoing call.

Other examples of such rules may include IA server 265 sharing information with the caller at the command of the callee. For example, IA server 265 may have access to user information (e.g., credit card information, contact information, a street address of the user etc.), and the callee may request that it be shared with the caller via MRF 255 or otherwise. In response to the command from the callee, IA server 265 may obtain the information and provide the information to the caller. In another example, if the callee is placed on hold, the callee may request that IA server 265 stay on the call and wait for the caller to return, and when the caller returns, IA server 265 may inform the caller that the callee will be back momentarily and cause a call request to be sent to callee UE 205 to invite the callee back to the call. In some embodiments, callee may configure IA server 265 to playback music, an audio track, stream a video, or provide another type of media to individuals on a call. For example, if the callee is placed on hold and causes IA server 265 to stay on the call until the caller returns, IA server 265 may playback music once the caller returns to the call and while IA server is contacting the caller to rejoin the call.

In some embodiments, a callee may contact IA server 265 and request one or more services. For example, the callee may call, text, or otherwise contact IA server 265 with a request for IA server 265 to schedule a meeting, dictate a to-do list and have the list sent to the callee or a caller, schedule a reminder task (e.g., remind the callee and one or more callers about a meeting, a lunch, an activity, etc.), etc. In some embodiments, the callee may cause (e.g., via audible or text command) IA server 265 to create a recording, transcript, brief, summary, or other types of notes/records relating to a call, text message session (e.g., SMS messages exchanged during a messaging session involving two or more people), etc.

In some embodiments, IA server 265 may create rules using transcribed and/or non-transcribed data. An example of transcribed data may include strings of information corresponding to natural-language-understanding (NLU) and/or to explicit software code, commands, instructions, and data. An example of non-transcribed data may include metadata, identity data, etc. Rules created, by IA server 265, from non-transcribed data, or a combination of transcribed and non-transcribed data, may be an abstraction (e.g., derived from but not completely defined by) of the non-transcribed data. In some embodiments, IA server 265 may include (or otherwise have access to) one or more of the operations, functions, and/or features of AI serer 275, as described herein, for creating and applying IA service rules.

In some embodiments, IA server 265 may identify and resolve problems with the rule set. For instance, IA server 265 may test the rule set by applying the rules to one or more hypothetical call scenarios to determine whether the compiled rule set includes any deficiencies (e.g., a lack of instructions for responding to a particular scenario, a lack of a dependency between to rule, etc.). Additionally, IA server 265 may operate to resolve the deficiencies automatically (e.g., when there is only one way, or a way that is clearly superior, to correct the deficiency) or by notifying the user about the deficiencies, providing the user with options or instructions about how to address the deficiencies, and prompting the user to specify how he or she would like to resolve the deficiencies. In some embodiments, IA server 265 may determine a recommended resolution to a deficiency and provide the recommendation to the user along with a prompt to either accept the recommendation or specify an alternative solution to the deficiency.

In some embodiments, IA server 265 may provide services to a user that is not registered for IA services. For example, in some embodiments, the user may be caller that is attempting to contact (e.g., call or text message) a user registered for IA services. Additionally, or alternatively, a wireless telecommunication network and/or IA server 265 may be configured to provide IA services (e.g., which may correspond to a default or otherwise pre-selected set of rules) to any subscriber of the wireless telecommunication network (e.g., regardless of whether they are registered for IA services), any caller (or UE) using the wireless telecommunication network, and/or one or more other types of users (or UEs) that are not otherwise registered for IA services.

As shown, process 300 may also include storing the rule set (block 350). For example, after creating a rule set based on inputs from a registered user, IA server 265 may store the rule set for later use. In some embodiments, storing the rule set may include associating the rule set with service account, telephone number (or other UE identifier), email address, username, user profile, etc., of the user and/or a UE 205 of the user. IA server 265 may store the rule set locally and/or cause the rule set to be stored remotely (e.g., by HSS 230, TAS 245, etc.).

Figure 5:
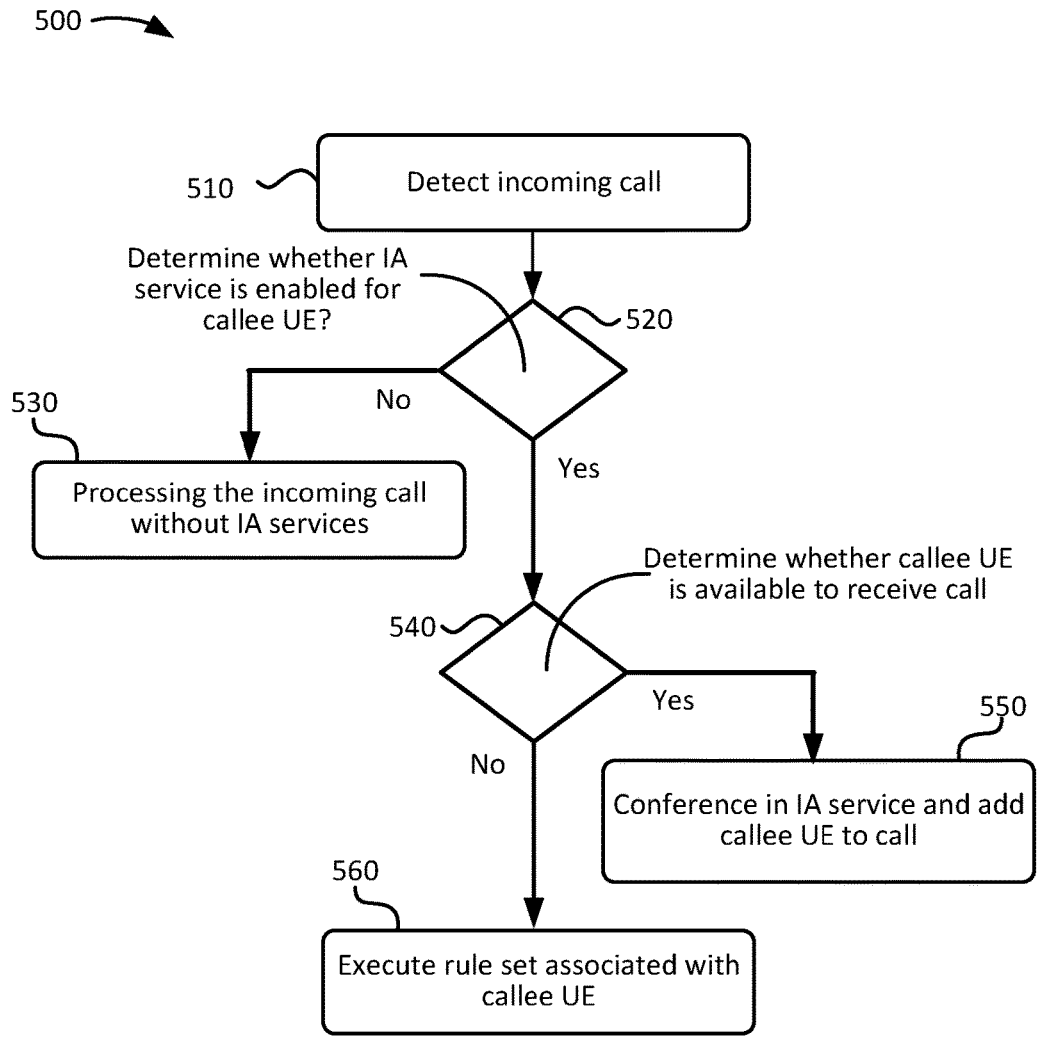
FIG. 5 is a diagram of an example process for registering a user for IA services.

FIG. 5 is a diagram of an example process for registering a user for IA services. Process 500 may be performed by IA server 265. In some embodiments, some or all of process 500 may be performed by one or more other devices, including TAS 245, MRF 255, SBC 260, or an application server of the wireless telecommunication network or the external network.

As shown, process 500 may include detecting an incoming call (block 510). For example, IA server 265 may detect a call request received by the wireless telecommunication network. IA server 265 may intercept the call by temporarily preventing the call request to be processed by the network as a standard call request. In some embodiments, IA server 265 may intercept the call by preventing the call request from being forwarded to the UE 205 to which the call request is directed.

Process 500 may also include determining whether IA services are enabled for the callee UE (block 520). For example, the incoming call may include a call request with the telephone number of the UE to which the call is directed. IA server 265 may use the telephone number (or another type of identifier, such as an International Mobile Subscriber Identity ("IMSI") value or an International Mobile Station Equipment Identity ("IMEI")), etc.) to search a database of user accounts that each include one or more identifiers of UEs 205 registered for IA services. IA server 265 may determine whether the incoming call is directed to a UE 205 registered for IA services based on whether the telephone number in the requests matches a telephone number of one of the user accounts.

When IA services are not enabled for the callee UE 205 (block 520—No), process 500 may include processing the call without IA services (block 530). For example, upon determining that the callee UE 205 is not registered for IA services, IA server 265 may cause the incoming call to be processed as a standard call (e.g., a call without IA services). This may include sending a message or request to one or more IMS devices to proceed with processing the call request in a standard manner.

When IA services are enabled for the callee UE 205 (block 520—Yes), process 500 may include determining whether the callee UE 205 is available to receive the call (block 540). For example, when an incoming call is directed to a particular UE 205 that is registered for IA services, IA server 265 may determine whether the UE 205 is available to receive the incoming call. In some embodiments. this may include determining whether the callee UE 205 is currently connected to the wireless telecommunication network and/or in a particular mode of operation (e.g., an active mode, an idle mode, etc.). Additionally, or alternatively, the availability of the callee UE 205 may be based on an availability status explicitly provided by the user. For instance, the IA services described herein may include enabling a registered user to explicitly indicate when he or she is available (or unavailable) to receive calls.

The user may provide scheduling information and/or geographic location information that describe times and locations when the user is unavailable to receive calls. The geographic location of the user may be inferred by a geographic location of UE 205 associated with the user. Additionally, or alternatively, the user may inform IA server 265 (e.g., via a browser or mobile application installed on a UE 205 of the user) when the user is unavailable. For instance, when the user is in an important meeting or otherwise does not want to receive calls, the user may inform IA server 265 that the user is unavailable to receive calls (for a particular duration, until a particular time, or until the user informs IA server 265 that the user is once again available to receive calls).

When the callee UE 205 is available to receive the call, process 500 may include conferencing in the IA service and the callee UE 205 to the call (block 550). For example, IA server 265 may send a request to the callee UE 205 to join the call, and establish a call that includes the UE 205 of the caller, IA server 265, and the UE 205 of the callee. After the call has been established, IA server 265 may continue to provide IA services based on audible requests from the callee (e.g., a request to record the call, add other UEs 205 to the call, reschedule the call, send a text message to the UE 205 of the caller and/or a UE 205 of one or more other users, etc.).

When the callee UE 205 is unavailable to receive the call, process 500 may include executing a rule set associated with the callee UE 205 (block 560). As described herein, the rule set may include instructions about how IA server 265 is to manage the call. Additionally, the rule set may include one or more rules specified by the user of the callee UE 205, rules specified by IA server 265, conditions, rule dependencies, etc.

Figure 6:
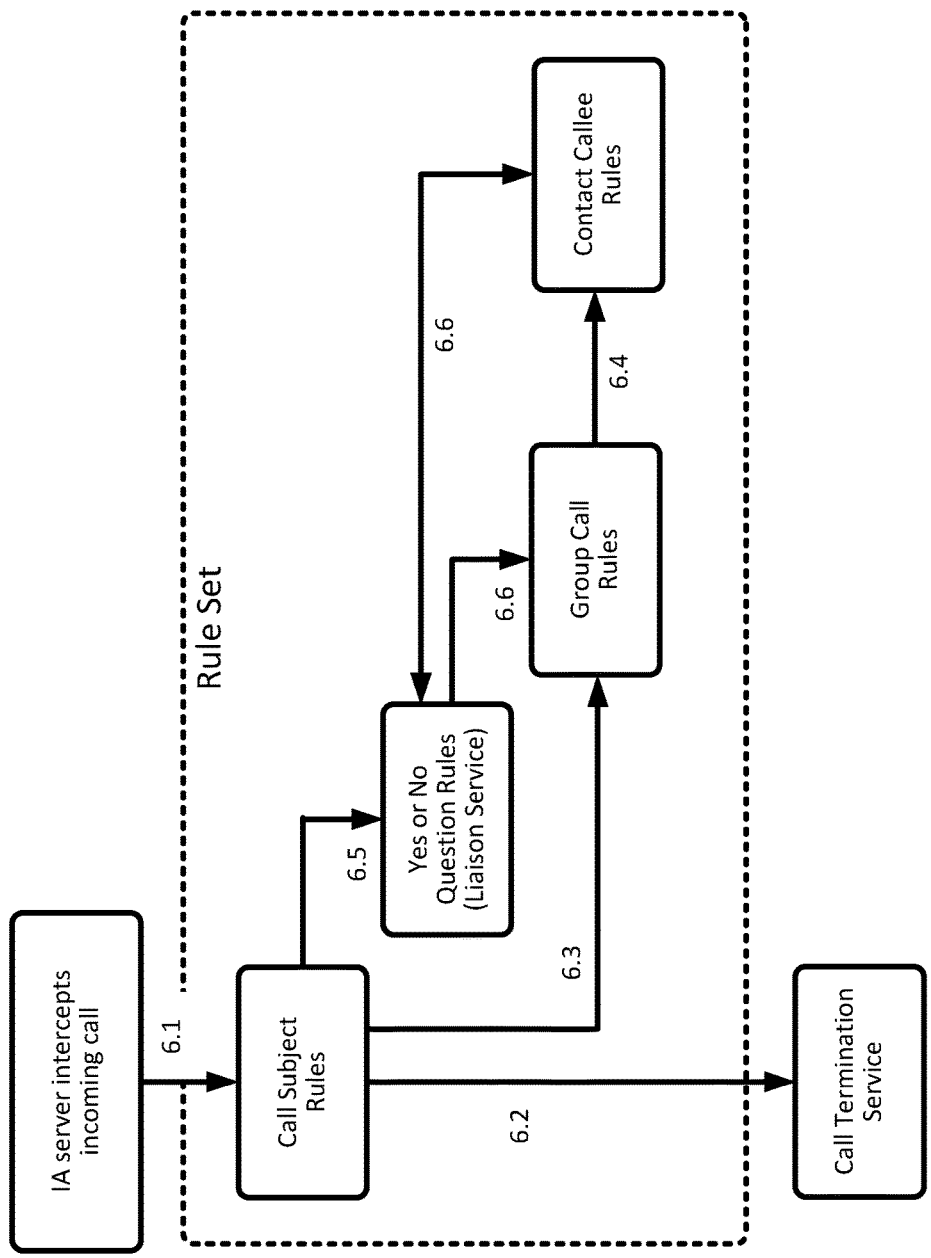
FIG. 6 is a diagram of an example of managing a call in accordance with a rule set.

FIG. 6 is a diagram of an example of managing a call in accordance with a rule set. The operations of FIG. 6 may be performed by IA server 265. In some embodiments, one or more of the operations described in FIG. 6 may be performed by one or more other devices, including TAS 245, MRF 255, SBC 260, text-to-speech server 270, AI server 275, or an application server of the wireless telecommunication network or the external network. The rule set of FIG. 6 is provided for example purposes only. In practice, a rule set may include fewer rules, additional rules, alternative rules, and/or differently arranged rules.

As shown, IA server 265 may receive an incoming call directed to a UE 205 that is registered for IA services (at 6.1). Assume that the callee is registered for IA services, and that IA server 265 determines that the callee is unavailable to receive calls but the UE 205 of the callee is attached to the network. IA server 265 may respond to the call by implementing one or more call subject rules to determine the purpose for the call and how important the call is to the callee. If IA server 265 determines that the call is of little or no importance to the callee (e.g., is an unsolicited sales call, an automated or politically themed call, a request to participate in a survey, etc.), IA server 265 may automatically terminate the call (at 6.2).

If IA server 265 determines that the call is of great importance (e.g., an emergency, a call from a particularly important person or organization, etc.) IA server 265 may apply one or more additional call subject rules. For example, IA server 265 may notify the callee of the important call (e.g., by causing the UE 205 of the callee to vibrate, make a particular sound, and/or by sending a text message indicating the importance of the call). Additionally, or alternatively, IA server 265 may apply one or more group call rules, which may include automatically setting up a group call that includes the UE 205 of the caller, the IA server 265, and the UE of the callee (at 6.3 and 6.4).

If IA server 265 determines that the call is of moderate importance (e.g., not a telemarketing call but also not an emergency), IA server 265 may apply yes or no question rules (i.e., a liaison service) between the caller and the callee (at 6.5). For instance, IA server 265 may offer to relay a simple question to the callee via text message or email, receive a response to the question from the callee, and provide the response to the caller. For example, the caller may ask (via IA server 265) whether the callee remembers the caller, and the callee may respond with a simple yes or no. In some embodiments, after IA server 265 provides the caller with the response to his or her question, IA server 265 may offer another type of service, such as a dictation service, whereby IA server 265 may invite the caller to leave a longer, more detailed message for the callee, which could be recorded and provided to the callee as an audio recording, transcribed and sent via email, etc., depending upon the preference of the callee or the caller.

Additionally, at some point during the reception, transcription, and relaying of messages between the caller and the callee, IA server 265 apply group call rules and contact callee rules to create a group call between the caller, IA server 265, and the caller (at 6.6 and 6.4). For example, in response to a question from the callee, the caller may communicate a request to IA server 265 to add the UE 205 of the callee to the call. In response, IA server 265 may notify the caller that the callee will be joining the call and proceed to set up a group call that includes the UE 205 of the caller, the IA server 265, and the UE 205 of the callee.

Figure 7:
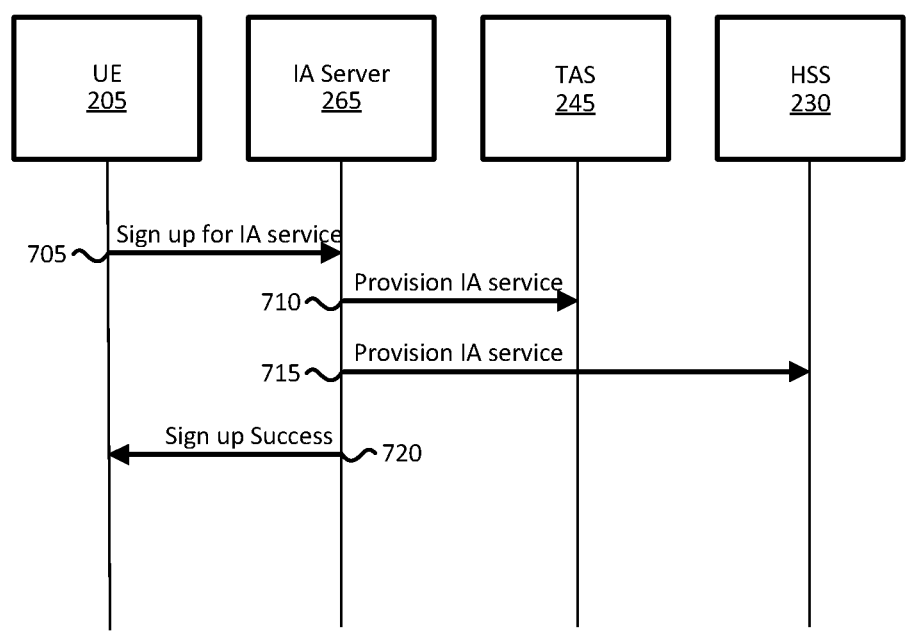
FIG. 7 is a diagram of an example of provisioning network devices for IA services.

FIG. 7 is a diagram of an example of provisioning network devices for IA services. As shown, the example of FIG. 7 includes UE 205, IA server 265, TAS 245, and HSS 230. Each of these devices are discussed above with reference to FIG. 2. In some embodiments, one or more of the functions performed by TAS 245 and/or HSS 230, as described below, may be performed (in whole or in part) by IA server 265.

A user of UE 205 may communicate with IA server 265 to sign up or otherwise register for IA services as described herein (at 705). In some embodiments, UE 205 may communicate with IA server 265 via a RAN of a wireless telecommunications network. In other embodiments, UE 205 may communicate with IA server 265 via another network, such as the Internet. As described herein, registering for IA services may include the user selecting or otherwise specifying rules that determine how, when, in what manner, etc., the IA services will be provided (e.g., how IA server 265 will handle and manage incoming calls). Registering for IA services may also include creating a user account and specifying UE 205 (e.g., a smartphone, tablet computer, etc.) for which the user would like IA services provided.

IA server 265 may respond to UE 205 by setting up, configuring, or otherwise provisioning TAS 245 to help ensure that IA services are provided for incoming calls directed to the UE 205 that has been registered for IA services (at 710). In some embodiments, IA server 265 may do so by identifying a particular TAS 245 designated to manage calls for the registered UE 205, and providing instructions to TAS 245 to communicate with HSS 245 to check for rules about how incoming calls, directed to the registered UE 205, should be handled (e.g., what services should be provided to the registered UE 205).

IA server 265 may also provision HSS 230 to help ensure that IA services are provided for incoming calls directed to the UE 205 (at 710). For instance, IA server 265 may identify a particular HSS 230 designated as the HSS 230 for UE 205, notify the HSS 230 that UE 205 has been registered for IA services, and/or provide HSS 230 with instructions about sending incoming calls (that are initially directed to the registered UE 205) to instead be sent to IA server 265 instead of registered UE 205 (at 715). As such, provisioning TAS 245 and HSS 230 for IA services may cause incoming calls, initially directed to the newly registered UE 205, to instead be sent to (e.g., intercepted by) IA server 265 so that the call may be handled in accordance with the rule set specified by the user of the registered UE 205. (An example of TAS 245 and HSS 230 causing an incoming call to be sent to IA server 265, instead of the registered UE 205, is described below with reference to FIG. 8.) Additionally, as shown in FIG. 7, after the user has registered UE 205 for IA services, and the network (e.g., TAS 245 and HSS) has been provisioned to provide the IA services, IA server 265 may send a confirmation, to UE 205, that the user has successfully signed up for IA services (at 720).

Figure 8:
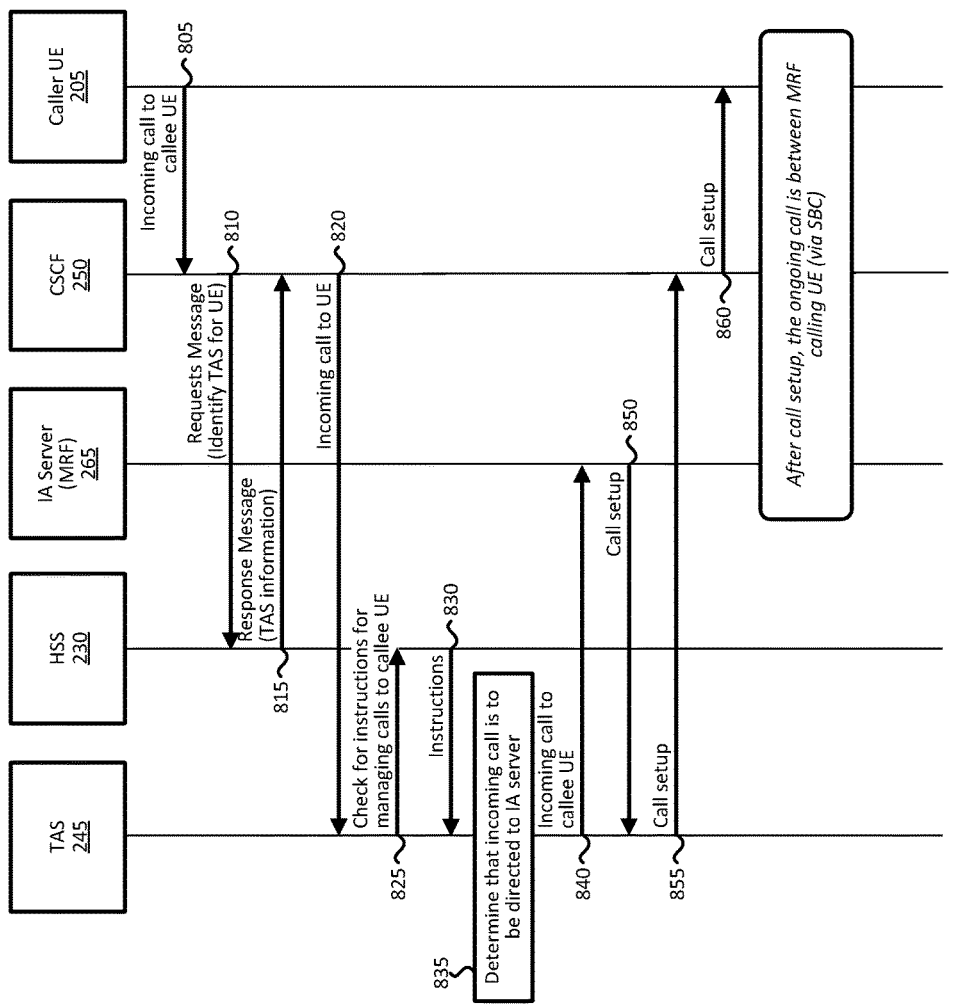
FIG. 8 is a diagram of an example of setting up a call in accordance with IA services.

FIG. 8 is a diagram of an example of setting up a call in accordance with IA services. As shown, the example of FIG. 8 may include TAS 245, HSS 230, IA Server 265, CSCF 250, and caller UE 205. Each of these devices is discussed above with reference to FIG. 2. Caller UE 205 may include an example of UE 205 being used to initiate a call with another UE 205 (referred to herein as "callee UE 205"). Additionally, assume that IA server 265 includes a MRF or operates in conjunction with MRF server 255. Similarly, in some embodiments, one or more of the functions performed by TAS 245 and/or HSS 230, as described with reference to FIG. 8, may be performed (in whole or in part) by IA server 265.

As shown, a user of caller UE 205 may initiate a call (e.g., via a call request) that is directed to a particular UE 205 (e.g., callee UE 205) (at 805). The call request may be received by CSCF 250 of the IMS core. In some embodiments, the call request may first be received SBC 260, and the sent to CSCF 250 by SBC 260. CSCF 250 may communicate a request, to identify a TAS 245 associated with the callee UE 205, to HSS 230 (at 810). In response, HSS 230 may identify the appropriate TAS 245, and respond to CSCF 250 by notifying CSCF 250 about the TAS 245 associated with the callee UE 205 (at 815).

CSCF 250 may notify the TAS 245 identified by HSS 230 regarding the incoming call from caller UE 205 (at 820). In response to the notification, TAS 245 may send a request to HSS 230 for rules or instructions about how to handle incoming calls for callee UE 205 (at 825). HSS 230 may respond to TAS 245 with the requested rules (at 830). TAS 245 may determine, based on the rules, the incoming call is to be directed to IA server 265, instead of callee UE 205, thus enabling IA server 265 to intercept the incoming call and provide the IA services for which callee 205 has been registered. As such, TAS 245 may proceed by communicating the incoming call (e.g., the call request) to IA server 265 (at 840), and IA server 265, TAS 245, CSCF 250, and caller UE 205 may communicate call setup messages to one another (as shown at 850, 855, and 860) in order to setup the call between IA server 265 and caller UE 205. After the call is setup, the ongoing call may be between IA server 265 and caller UE 205 (via SBC 260).

As mentioned above, the instructions sent by HSS 230 to TAS 245 indicated that the incoming call was to be sent to IA server 265, which (in the example of FIG. 8) included MRF capabilities. In some embodiments however, such as when IA server 265 and MRF 255 are implemented as distinct devices, the instructions sent by HSS 230 to TAS 245 may indicate that the call is to be sent to MRF 255 (since MRF 255 may have IVR capabilities) instead of IA server 265. The resulting call, in such a scenario, may therefore be between MRF 255 and caller UE 205 (via SBC 260). An example of IA server 265 and MRF 255 implemented as distinct devices is presented below.

Figure 9:
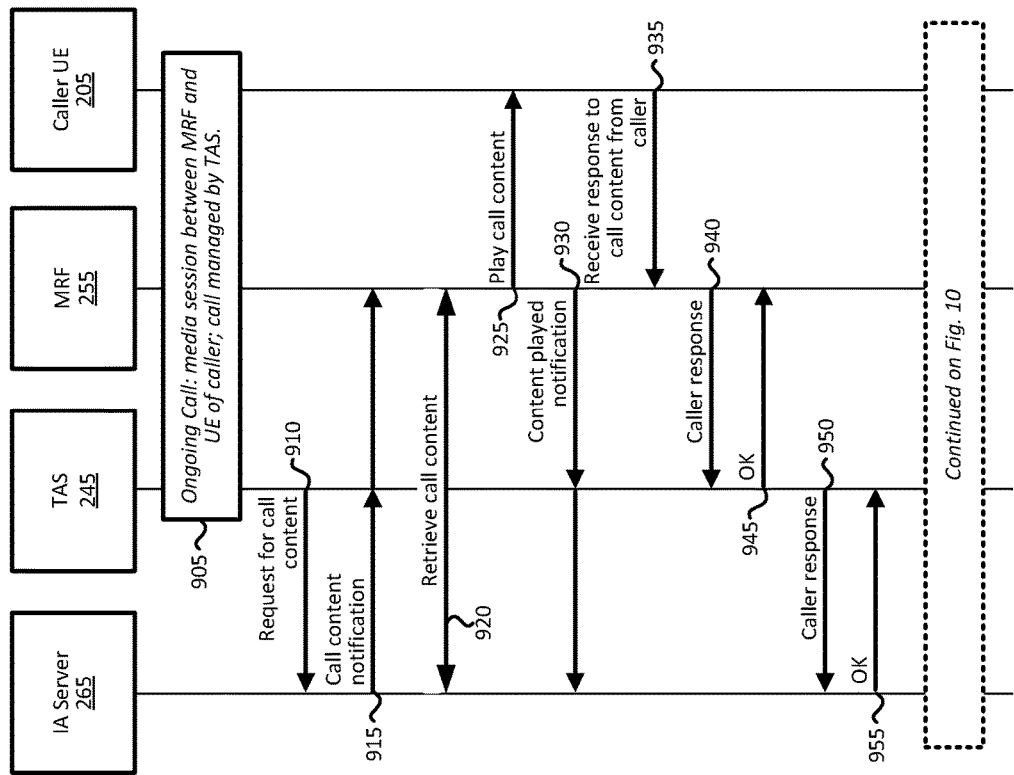
FIGS. 9 and 10 are diagrams of an example of providing IA services.
Figure 10:
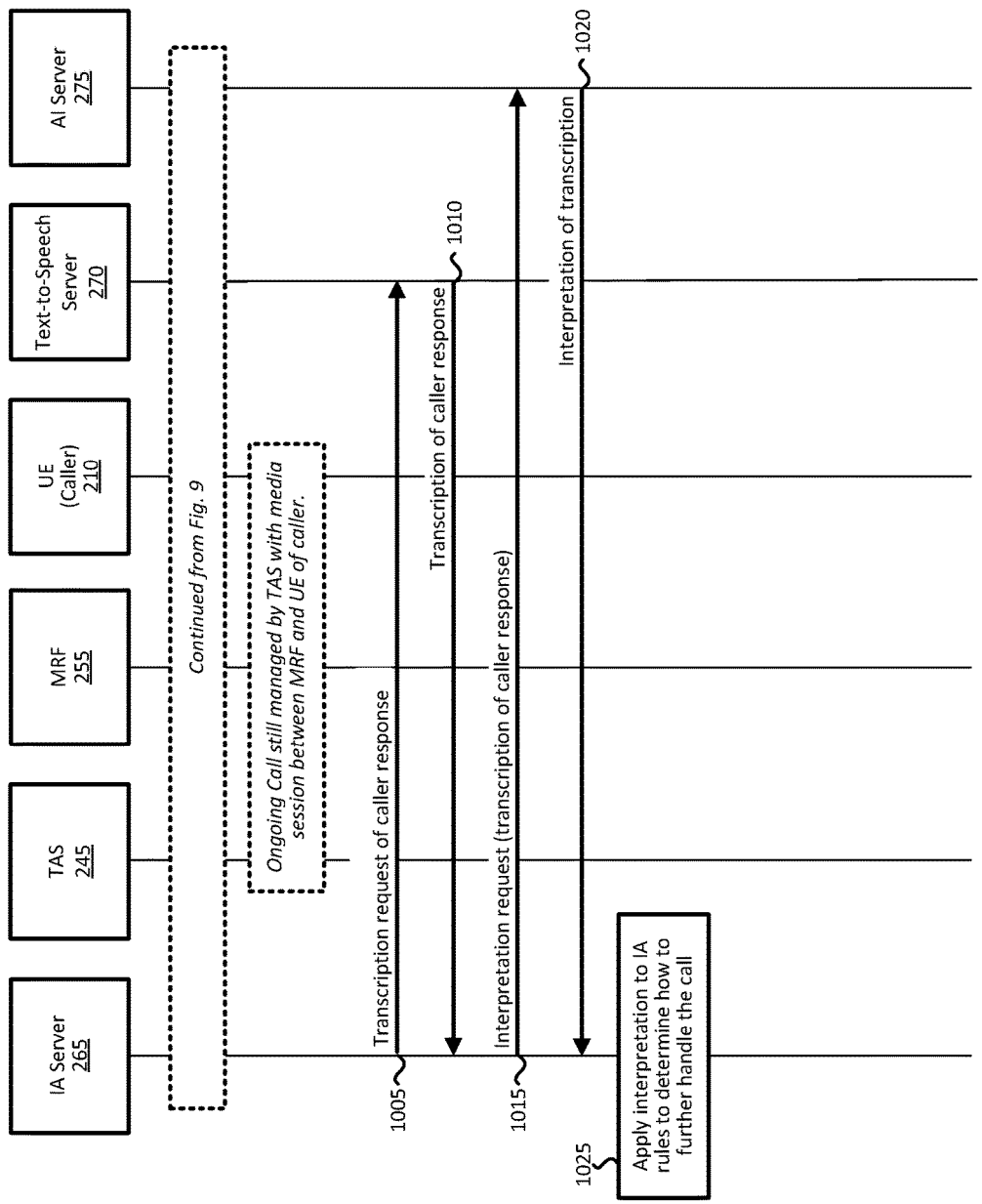

FIGS. 9 and 10 are diagrams of an example of providing IA services. As shown in FIG. 9, the example may include IA server 265, TAS 245, MRF 255, and caller UE 205. In addition to these devices, FIG. 10 includes text-to-speech server 270 and AI server 275. The devices of FIGS. 9 and 10 are discussed above with reference to FIG. 2. Additionally, in some embodiments, one or more of the functions performed by TAS 245 and/or MRF 255, as described with reference to FIGS. 9 and 10, may be performed (in whole or in part) by IA server 265.

As shown, assume that there is an ongoing call (e.g., a call has been established) between MRF 255 and caller UE 205, and the call is managed by TAS 245 (at 905). TAS 245 may send a request for call content to IA server 265 (at 910). The request may identify the callee UE 205 of the call (even though the callee UE 205 may not have been added to the call yet). Upon receiving the request, IA server 265 may identify one or more rules (e.g., a rule set) that corresponds to the callee UE 205. As described above, the rules may include instructions for how the user of the callee UE 205 would like calls to be handled by the IA service. Upon identifying a rule (and/or content associated with a rule, such as a greeting, statement, questions, etc.), IA server 265 may send a call content notification to TAS 245, and TAS 245 may relay the notification to MRF 255 (at 915). The notification may indicate that IA server 265 has identified content that may be played, or otherwise sent, communicated to caller UE 205.

In response to the notification, MRF 255 may retrieve the call content from IA server 265 (at 920) and play the call content to caller UE 205 (at 925). In some embodiments, MRF 255 may play or provide the call content to caller UE 205 via SBC 260. After providing the call content to the caller UE 205, MRF 255 may send a notification to TAS 245 that the content has been provided (e.g., to caller UE 205), and TAS 245 may relay the notification to IA server 265 (at 930). Additionally, MRF 255 may receive a response to the call content (e.g., an answer to a question about the purpose for the call, an answer to a yes or no question, etc.) from caller UE 205 (at 935), which may be relayed to IA server 265 via TAS 245 (at 940 and 950), triggering one or more acknowledgement or OK messages in response (as shown at 945 and 955). In some embodiments, the relayed response may include an audio recording (created by MRF 255) of the response from the caller.

Referring now to FIG. 10, IA server 265 may respond to the audio recording by communicating a request for the audio recording to be transcribed by text-to-speech server 270 (at 1005). The request may include a copy of the audio record or information and instructions that enable (or cause) text-to-speech server 270 to subsequently retrieve the audio recording. Text-to-speech server 270 may receive and transcribe the audio recording to text, and provide the transcription to IA serer 265 (at 1010). IA server 265 may communicate a request to AI server 275 to analyze and interpret the text provided by text-to-speech server 270 (at 1015). In some embodiments, the request may include the transcript provided by text-to-speech server 270. In some embodiments, the request may also include a transcript of the question (or request) that prompted the response from the caller (i.e., a transcript of the question or request that MRF 255 played to the caller).

In some embodiments, the request from IA server 265 to AI server 275 may include a call-ID associated with ongoing call, which may enable AI server 275 to maintain a record of the responses received from the caller (and their corresponding questions or requests) over the course of the call. Maintaining such a record may aid AI server 275 in analyzing and interpreting caller input with greater accuracy by helping to create a more complete context for each input from the caller. For instance, assume that at the beginning of the call IA server 265 caused MRF 255 to ask what the caller was calling about. Upon receiving, transcribing, and interpreting the response from the caller, AI server 275 may provide an interpretation of the response to IA server 265. However, because of an incomplete response on the part of the caller, an error in transcribing the audio recording to text, or another deficiency, AI server 275 may only be able to provide a vague interpretation as to the purpose of the call, such that IA server 265 is unclear how to handle the call (e.g., terminate the call, send a text message to the callee UE 205, etc.). In such a scenario, IA server 265 may include rules for asking one or more follow-up questions as part of an attempt to ascertain a clearer understanding of the nature of the call. Each time a new response from the caller is transcribed and provided to AI server 275, AI server 275 may analyze the new response within the context of the questions and responses that have already been provided, thereby providing more information and greater context for interpreting the new response from the caller.

As shown in FIG. 10, upon interpreting a transcript received from IA server 265, AI server 275 may provide the interpretation to IA server 265 (at 1020). IA server 265 may apply the interpretation to IA rules (e.g., the rule set associated with the callee) to determine how to further handle the call (at 1025). In some embodiments, AI server 275 may determine, based on the callee's response (as interpreted by AI server 275) that the call should be handled by implementing another AI rule, such as asking the caller a follow-up question, which may involve the execution of a series of operations that are similar to those described in the example of FIGS. 9 and 10. In other words, a call session between a caller and MRF 255 may experience several iterations of the operations (or operations similar to) described in FIGS. 9 and 10.

Figure 11:
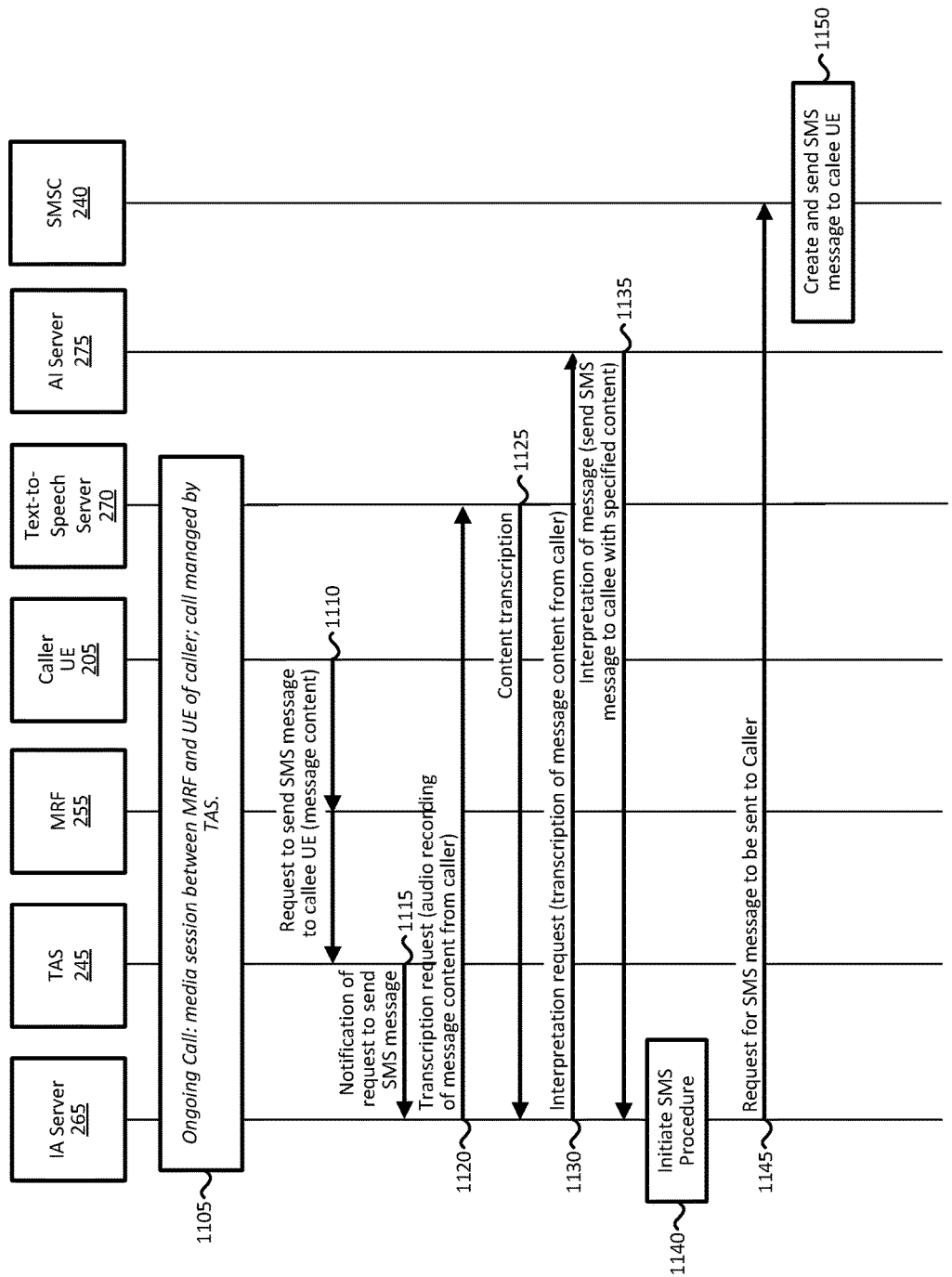
FIG. 11 is a diagram of an example of sending a message to a callee based on an input from a caller.

FIG. 11 is a diagram of an example of sending a message to a callee based on an input from a caller. As shown, the example of FIG. 11 may include IA server 265, TAS 245, MRF 255, caller UE 205, text-to-speech server 270, AI server 275, and SMSC 240. The devices of FIG. 11 are discussed above with reference to FIG. 2. Additionally, in some embodiments, one or more of the functions performed by TAS 245 and/or MRF 255, as described with reference to FIG. 11, may be performed (in whole or in part) by IA server 265.

As shown, assume that a call has already been established between MRF 255 and caller UE 205, and the call is being managed by TAS 245 (at 905). At some point during the call, caller UE 205 may proactively request that the IA service do something. An example of a proactive request may include the caller giving an audible command to MRF 255 without the caller being asked a question or receiving a request for information from MRF 255. In another example, the proactive command may be a response, by the caller, to an open-ended question from MRF 255, such as MRF 255 asking the caller how he or she would like to contact the callee, the answers to which could include, the callee deciding to call back in the next couple of days, requesting to make an appointment to call back at a specific date and time, leaving a voicemail, sending a text message, etc.).

For purposes of describing FIG. 11, assume that the caller decides to have a text message sent to the callee and, therefore, proactively tells MRF 255 to send a text message to the callee and states the content for the message (at 1110). For example (assume that the callee's name is "Sam"), the caller may say, "Send a text message to Sam, and tell him that lunch tomorrow has been rescheduled for 1 PM." In response, MRF 255 may record the message spoken by the caller, and provide an audio file of the recorded message to TAS 245 (at 1110). In turn, TAS 245 may notify IA server 265 of the request and provide a copy of the audio recording containing the message to IA server 265 (at 1115).

To understand what the caller is saying and then determine how to respond, IA server 265 may send a request, to text-to-speech server 270, to have the audio recording transcribed to a text format (at 1120). Text-to-speech server 270 may receive the request, transcribe the audio recording, and provide the transcription to IA server 265 (at 1125). Upon receiving the transcription, IA server 265 may send a request, to AI server 275, to have the transcription analyzed and interpreted (at 1130). The request may include instructions for AI server 275 to determine the meaning of the transcription (e.g., what the statements by the caller actually mean). Continuing from the example above, AI serer 275 may determine that the caller intends to have the IA service contact the callee via text message based on the command, "send a text message to the Sam." After determining the caller intends to have a text message sent to the callee, AI server 275 may determine that the transcript also include content for the message, which corresponds to the phrase, "tell him that lunch tomorrow has been rescheduled for 1 PM." Accordingly, AI server 275 may provide IA server 265 with the interpretation of the message (at 1135). For instance, AI server 275 may inform IA server 265 that the caller has requested that the callee be contacted via text message, and that the body of the text message should include "Lunch tomorrow has been rescheduled for 1 PM."

Upon receiving the interpretation, IA server 265 may initiate an SMS procedure in accordance with the request from the caller (at 1140). For example, IA server 265 may prepare a request to have a text message sent to the callee UE 205 and that the text message include the message content specified by AI server 275. Additionally, IA server 265 may send the request to SMSC 240 (at 1145), and SMSC 240 may respond by creating the SMS message and communicating the SMS message in accordance with the request (at 1150). In some embodiments, this may include an SMPP GW function, of SMSC 240, locating callee UE 205 with a network and determining how to send the SMS message given the location of callee UE 205 (e.g., via an SMS-IP-GW).

Figure 12:
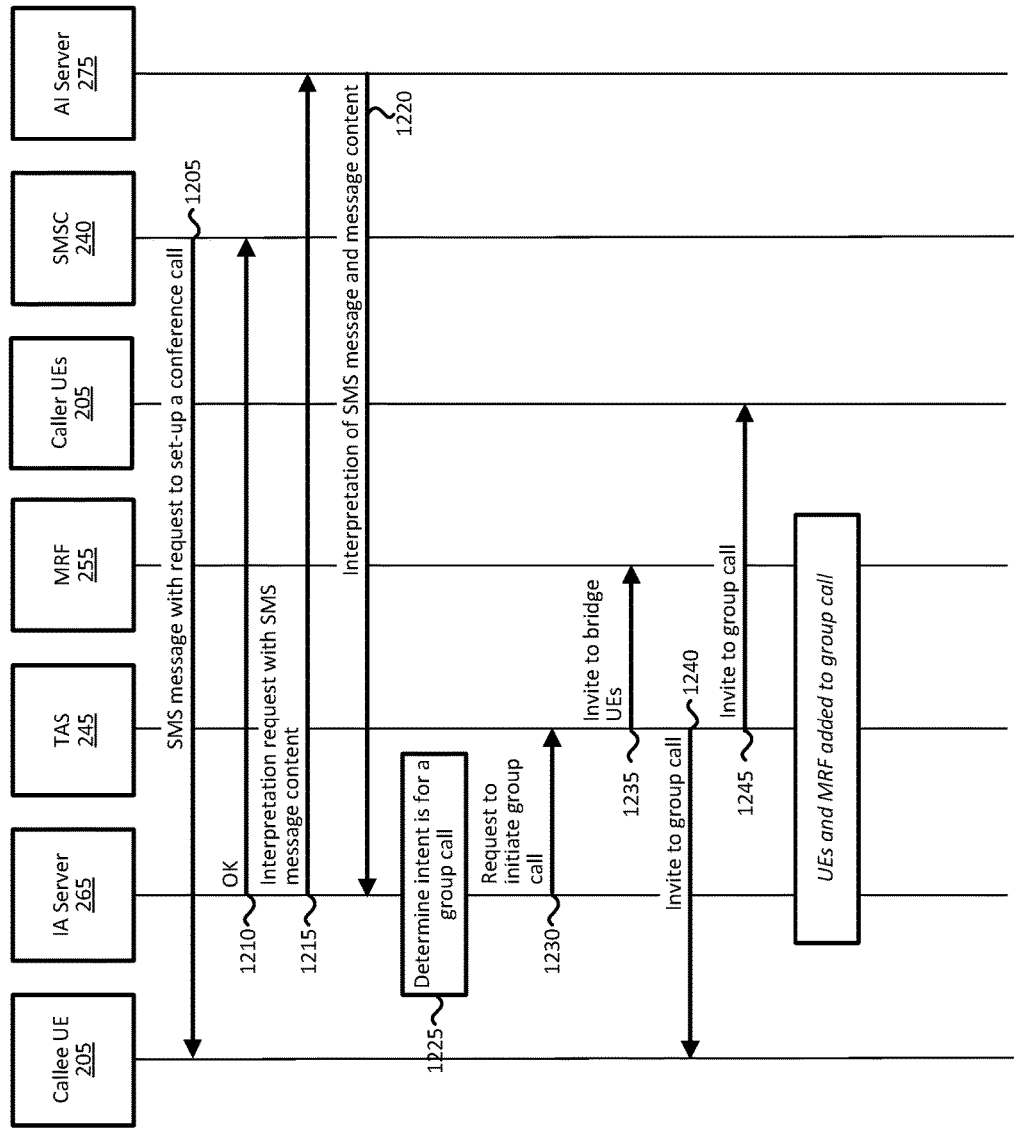
FIG. 12 is a diagram of an example for creating a group call in response to a text message from a user registered for IA services.

FIG. 12 is a diagram of an example for creating a group call in response to a text message from a user registered for IA services. As shown, the example of FIG. 12 may include callee UE 205, IA Server 265, TAS 245, MRF 255, CSCF 250, caller UE 205, text-to-speech server 270, SMSC 240, and AI server 275. The devices of FIG. 12 are discussed above with reference to FIG. 2. Additionally, in some embodiments, one or more of the functions performed by TAS 245 and/or MRF 255, as described with reference to FIG. 12, may be performed (in whole or in part) by IA server 265.

For the purposes of explaining the example of FIG. 12, assume that callee UE 205 is participating in an SMS group chat with caller UEs 205. Also, as text messages are sent to and from callee UE 205, IA server 265 may be monitoring the text messages for IA service requests (i.e., a request from callee UE 205 for a particular IA service). At some point during the group chat, the group of users may decide it would be more efficient to have a conference call, so the user of callee UE 205 may send a text message in the group chat, via SMSC 240, that includes a request for IA server 265 to automatically transition the SMS group chat to a group voice call. For example, the body of text message could include a phrase, such as "IA service, get us on a conf call now." As IA server 265 is monitoring the SMS group chat, SMSC 240 may provide IA server 265 with a copy of the message (at 1205), and IA server 265 may respond to the message with an acknowledgement message (at 1210).

IA server 265 may send a copy of the message to AI server 275, along with a request for AI server 275 to interpret the meaning of the message (at 1215), and AI server 275 may respond with an interpretation of the message and a copy of the message content (at 1220). IA server 265 may receive that interpretation from AI server 275 and determine that the purpose for the text message was to have IA server 265 establish a group call consisting of callee UE 205 and caller UEs 205 (since, for example, the text message was sent from callee UE 205 to caller UEs 205) (at 1225). IA server 265 may proceed by sending a request to TAS 245 to initiate a group call (at 1230). In some embodiments, the request may identify the UEs 205 to be invited to the group call. In some embodiments, the request may identify the SMS group chat and include instructions for TAS server 245 to identify and invite the UEs 205 of the SMS group chat.

In response, TAS server 245 may send instruction to MRF 255 to provide a bridge for the group call and/or an invitation to join the group call (at 1235). TAS server 245 may also send an invitation for callee UE 205 to join the group call (at 1240), as well as invitations to IA server 265 and each of the caller UEs 205 to join the group call (at 1245). As such, invitations to the group call are accepted, the group call may include MRF 255, callee UE 205, and caller UEs 205.

FIG. 13 is a diagram of example components of a device 1300. Each of the devices illustrated in FIGS. 1A-1D, 2, and 7-12 may include one or more devices 1300. Device 1300 may include bus 1310, processor 1320, memory 1330, input component 1340, output component 1350, and communication interface 1360. In another embodiment, device 1300 may include additional, fewer, different, or differently arranged components. As described herein, a component may be implemented by hardware circuitry, software logic, and/or some combination thereof.

Bus 1310 may include one or more communication paths that permit communication among the components of device 1300. Processor 1320 may include a processor, microprocessor, or processing logic that may interpret and execute instructions. Memory 1330 may include any type of dynamic storage device that may store information and instructions for execution by processor 1320, and/or any type of non-volatile storage device that may store information for use by processor 1320.

Input component 1340 may include a mechanism that permits an operator to input information to device 1300, such as a keyboard, a keypad, a button, a switch, etc. Output component 1350 may include a mechanism that outputs information to the operator, such as a display, a speaker, one or more light emitting diodes (LEDs), etc.

Communication interface 1360 may include any transceiver-like mechanism that enables device 1300 to communicate with other devices and/or systems. For example, communication interface 1360 may include an Ethernet interface, an optical interface, a coaxial interface, or the like. Communication interface 1360 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 1300 may include more than one communication interface 1360. For instance, device 1300 may include an optical interface and an Ethernet interface.

Device 1300 may perform certain operations described above. Device 1300 may perform these operations in response to processor 1320 executing software instructions stored in a computer-readable medium, such as memory 1330. A computer-readable medium may be defined as a non-transitory memory device. A memory device may include space within a single physical memory device or spread across multiple physical memory devices. The software instructions may be read into memory 1330 from another computer-readable medium or from another device. The software instructions stored in memory 1330 may cause processor 1320 to perform processes described herein. Alternatively, hardwired circuitry may be used in place of or in combination with software instructions to implement processes described herein. Thus, embodiments described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope set forth in the claims that follow. The specification and drawings are accordingly to be regarded in an illustrative rather than restrictive sense.

For example, while a series of lines, arrows, and/or blocks have been described regarding FIGS. 3 and 5-12 the order of the blocks and arrangement of the lines and/or arrows may be modified in other embodiments. Further, non-dependent blocks may be performed in parallel. Similarly, while series of communications have been described with regard to several of the Figures provided herein, the order or nature of the communications may potentially be modified in other embodiments.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operations and behaviors of the aspects that were described without reference to the specific software code—it being understood that software and control hardware could be designed to implement the aspects based on the description herein.

Further, certain portions may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be used in accordance with all applicable laws concerning protection" of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A server device, comprising:
   a non-transitory memory device storing a plurality of processor-executable instructions; and
   one or more processors configured to execute the processor-executable instructions, wherein executing the processor-executable instructions causes the one or more processors to:
   determine that a first UE, to which a call request from a second UE is directed, is registered for intelligent assistant (IA) services that are configured to assist the first UE during communication sessions with other UEs;
   identify, based on the call request, rules associated with the first UE for providing the IA services;
   determine, by applying the rules to the call request, that the call request is to be routed to the server device instead of to the first UE;
   cause the call request to be rerouted to the server device by establishing a communication session between the server device and the second UE;
   request, based on the rerouting, and via the established communication session with the UE, information regarding a reason for the call from the second UE;
   provide, to the first UE:
   the information regarding the reason for the call request, from the second UE, and
   in conjunction with the information regarding the reason for the call request, an option to join the established communication session;
   receive, from the first UE, a selection of the option to join the established communication session; and
   add the first UE to the communication session based on receiving the selection of the option to join the communication session.

2. The server device of claim 1, wherein executing the processor-executable instructions causes the one or more processors further to:
   receive, from a Telephony Application Server (TAS) of an Internet Protocol (IP) Multimedia Subsystem (IMS), a request to determine whether the first UE is registered for the IA services, the request including an identifier of the first UE; and
   use the identifier to query a database of user accounts registered for IA services; and
   determine, based on a user account resulting from the query, that the first UE is registered for IA services.

3. The server device of claim 2, wherein the identifier is a Mobile Device Number (MDN) of the first UE.

4. The server device of claim 1, wherein executing the processor-executable instructions causes the one or more processors to:
   cause the call request to be rerouted to the server device by:
   notifying a Telephony Application Server (TAS) of an Internet Protocol (IP) Multimedia Subsystem (IMS) that the first UE is registered for the IA services.

5. The server device of claim 1, wherein executing the processor-executable instructions, to request the information regarding the reason for the call request from the second UE, further causes the one or more processors to:
  receive, from the second UE and in response to the request for the information, a message from the second UE; and
  use an artificial intelligence (AI) technique to interpret a meaning of the message, wherein the reason for the call request from the UE is determined based on the interpreted meaning.

6. A method, comprising:
  determining, by a server device, that a first UE, to which a call request from a second UE is directed, is registered for intelligent assistant (IA) services that are configured to assist the first UE during communication sessions with other UEs;
  identifying, by the server device and based on the call request, rules associated with the first UE for providing the IA services;
  determining, by the server device and by applying the rules to the call request, that the call request is to be routed to the server device instead of to the first UE;
  causing, by the server device, the call request to be rerouted to the server device by establishing a communication session between the server device and the second UE;
  requesting, by the server device and based on the rerouting, and via the established communication session with the UE, information regarding a reason for the call from the second UE;
  providing, by the server device and to the first UE:
    the information regarding the reason for the call request, from the second UE, and
    in conjunction with the information regarding the reason for the call request, an option to join the established communication session;
  receiving, by the server device and from the first UE, a selection of the option to join the established communication session; and
  add the first UE to the communication session based on receiving the selection of the option to join the communication session.

7. The method of claim 6, further comprising:
  receiving, from a Telephony Application Server (TAS) of an Internet Protocol (IP) Multimedia Subsystem (IMS), a request to determine whether the first UE is registered for the IA services, the request including an identifier of the first UE; and
  using the identifier to query a database of user accounts registered for IA services; and
  determining, based on a user account resulting from the query, that the first UE is registered for IA services.

8. The method of claim 7, wherein the identifier is a Mobile Device Number (MDN) of the first UE.

9. The method of claim 6, wherein causing the call request to be rerouted to the server device includes:
  notifying a Telephony Application Server (TAS) of an Internet Protocol (IP) Multimedia Subsystem (IMS) that the first UE is registered for the IA services.

10. The method of claim 6, wherein requesting the information regarding the reason for the call request from the second UE further includes:
  receiving, from the second UE and in response to the request for the information, a message from the second UE; and
  using an artificial intelligence (AI) technique to interpret a meaning of the message, wherein the reason for the call request from the UE is determined based on the interpreted meaning.

11. A non-transitory computer readable medium storing a plurality of processor-executable instructions, wherein executing the processor-executable instructions causes one or more processors to:
  determine that a first UE, to which a call request from a second UE is directed, is registered for intelligent assistant (IA) services that are configured to assist the first UE during communication sessions with other UEs;
  identify, based on the call request, rules associated with the first UE for providing the IA services;
  determine, by applying the rules to the call request, that the call request is to be routed to the server device instead of to the first UE;
  cause the call request to be rerouted to the server device by establishing a communication session between the server device and the second UE;
  provide, to the first UE:
    the information regarding the reason for the call request, from the second UE, and
    in conjunction with the information regarding the reason for the call request, an option to join the established communication session;
  receive, from the first UE, a selection of the option to join the established communication session; and
  add the first UE to the communication session based on receiving the selection of the option to join the communication session.

12. The non-transitory computer readable medium of claim 11, wherein executing the processor-executable instructions causes the one or more processors further to:
  receive, from a Telephony Application Server (TAS) of an Internet Protocol (IP) Multimedia Subsystem (IMS), a request to determine whether the first UE is registered for the IA services, the request including an identifier of the first UE; and
  use the identifier to query a database of user accounts registered for IA services; and
  determine, based on a user account resulting from the query, that the first UE is registered for IA services.

13. The non-transitory computer readable medium of claim 12, wherein the identifier is a Mobile Device Number (MDN) of the first UE.

14. The non-transitory computer readable medium of claim 11, wherein executing the processor-executable instructions causes the one or more processors further to:
  cause the call request to be rerouted to the server device by:
    notifying a Telephony Application Server (TAS) of an Internet Protocol (IP) Multimedia Subsystem (IMS) that the first UE is registered for the IA services.

15. The non-transitory computer-readable medium of claim 11, wherein the processor-executable instructions, to request the information regarding the reason for the call request from the second UE, further include processor-executable instructions to:
  receive, from the second UE and in response to the request for the information, a message from the second UE; and
  use an artificial intelligence (AI) technique to interpret a meaning of the message, wherein the reason for the call from the UE is determined based on the interpreted meaning.

16. The non-transitory computer-readable medium of claim 15, wherein the meaning of the message indicates that at least a third UE should be added to the communication session, wherein executing the processor-executable instructions further causes the one or more processors to:
  contact the third UE based on determining that the meaning of the message indicates that at least the third UE should be added to the communication session; and
  add, based on contacting the third UE, the third UE to the call session, such that the first, second, and third UEs are simultaneously engaged in the communication session after the third UE has been added.

17. The non-transitory computer-readable medium of claim 15, wherein the message from the second UE includes a Short Messaging Service ("SMS") message.

18. The server device of claim 5, wherein the meaning of the message indicates that at least a third UE should be added to the communication session, wherein executing the processor-executable instructions further causes the one or more processors to:
  contact the third UE based on determining that the meaning of the message indicates that at least the third UE should be added to the communication session; and
  add, based on contacting the third UE, the third UE to the call session, such that the first, second, and third UEs are simultaneously engaged in the communication session after the third UE has been added.

19. The server device of claim 5, wherein the message from the second UE includes a Short Messaging Service ("SMS") message.

20. The method of claim 10, wherein the meaning of the message indicates that at least a third UE should be added to the communication session, the method further comprising:
  contacting the third UE based on determining that the meaning of the message indicates that at least the third UE should be added to the communication session; and
  adding, based on contacting the third UE, the third UE to the call session, such that the first, second, and third UEs are simultaneously engaged in the communication session after the third UE has been added.

* * * * *